US011974295B2

(12) United States Patent
Awad et al.

(10) Patent No.: US 11,974,295 B2
(45) Date of Patent: *Apr. 30, 2024

(54) COMMUNICATION SYSTEM

(71) Applicant: NEC Corporation, Tokyo (JP)

(72) Inventors: Yassin Aden Awad, Umbridge (GB);
Yasushi Maruta, Tokyo (JP);
Toshifumi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,967

(22) Filed: May 16, 2022

(65) Prior Publication Data

US 2022/0272676 A1 Aug. 25, 2022

Related U.S. Application Data

(63) Continuation of application No. 16/893,736, filed on Jun. 5, 2020, now Pat. No. 11,337,204, which is a
(Continued)

(30) Foreign Application Priority Data

Jul. 25, 2011 (GB) ...................................... 1112752

(51) Int. Cl.
*H04B 1/10* (2006.01)
*H04W 72/044* (2023.01)
(Continued)

(52) U.S. Cl.
CPC ....... *H04W 72/23* (2023.01); *H04W 72/0453* (2013.01); *H04W 72/046* (2013.01); *H04W 72/20* (2023.01); *H04W 16/28* (2013.01)

(58) Field of Classification Search
CPC ............. H04W 72/23; H04W 72/0453; H04W 72/046; H04W 72/20; H04W 16/28;
(Continued)

(56) References Cited

U.S. PATENT DOCUMENTS 6,330,459 B1 12/2001 Crichton et al.
8,472,954 B2 6/2013 Nogami et al.
(Continued)

FOREIGN PATENT DOCUMENTS

CN 101772179 A 7/2010
CN 101924610 A 12/2010
(Continued)

OTHER PUBLICATIONS

3GPP, "Evolved Universal Terrestrial Radio Access (E-UTRA); Physical Channels and Modulation," 3GPP TS 36.211, Technical Specification, 3rd Generation partnership Project; Technical Specification Group Radio Access Network, Release 10, V10.2.0, 59 pages (Jun. 2011).
(Continued)

*Primary Examiner* — Stephen M D Agosta

(57) ABSTRACT

A communication system is presented in which a base station is provided for communicating with a plurality of mobile communication devices in a cellular communication system. The base station operates one of more communication cells and communicates subframes, with each of the plurality of communication devices within the cell(s), each comprising the communication resources of a control region for communicating a control channel and the communication resources of a data region for communicating a respective data channel. The base station communicates a control channel having a first DMRS sequence in a control region of some subframes and a control channel having a second DMRS sequence in a control region of other subframes. The second control channel may be transmitted in a radio beam focused spatially in a direction of a communication device. The first control channel may be transmitted omnidirectionally throughout the cell(s).

4 Claims, 17 Drawing Sheets

Related U.S. Application Data continuation of application No. 14/993,636, filed on Jan. 12, 2016, now Pat. No. 10,716,103, which is a continuation of application No. 13/818,294, filed as application No. PCT/JP2012/069523 on Jul. 25, 2012, now Pat. No. 9,271,272.

(51) Int. Cl.
*H04W 72/0453* (2023.01)
*H04W 72/20* (2023.01)
*H04W 72/23* (2023.01)
*H04W 16/28* (2009.01)

(58) Field of Classification Search
CPC ... H04B 7/0619; H04B 7/0695; H04L 5/0051; H04L 5/0053; H04L 5/0023
See application file for complete search history.

(56) References Cited

U.S. PATENT DOCUMENTS

| | | | |
|---|---|---|---|
| 9,008,035 B2* | 4/2015 | Qu | H04L 5/0016 370/335 |
| 9,084,238 B2* | 7/2015 | Gao | H04L 5/0016 |
| 9,236,991 B2 | 1/2016 | Frenne | H04L 5/0094 |
| 9,276,722 B2 | 3/2016 | Gaal | H04L 5/0051 |
| 9,553,655 B2* | 1/2017 | Park | H04L 5/0053 |
| 10,506,571 B2* | 12/2019 | Kim | H04W 72/20 |
| 2008/0080560 A1 | 4/2008 | Inoue et al. | |
| 2010/0150083 A1 | 6/2010 | Toda et al. | |
| 2010/0182903 A1 | 7/2010 | Palanki et al. | |
| 2010/0189064 A1 | 7/2010 | Raveendran | |
| 2010/0195599 A1 | 8/2010 | Zhang et al. | |
| 2010/0198159 A1 | 8/2010 | Voss et al. | |
| 2010/0303011 A1 | 12/2010 | Pan et al. | |
| 2010/0303034 A1 | 12/2010 | Chen et al. | |
| 2011/0103324 A1 | 5/2011 | Nam et al. | |
| 2011/0170496 A1 | 7/2011 | Fong et al. | |
| 2011/0194536 A1 | 8/2011 | Kim et al. | |
| 2011/0211595 A1 | 9/2011 | Geirhofer | H04B 7/155 370/478 |
| 2012/0027120 A1 | 2/2012 | Noh | H04L 5/0048 375/295 |
| 2012/0114021 A1 | 5/2012 | Chung | H04B 7/15557 375/211 |
| 2012/0140746 A1 | 6/2012 | Zhu et al. | |
| 2012/0207126 A1 | 8/2012 | Qu et al. | |
| 2012/0282936 A1 | 11/2012 | Gao | H04L 5/0053 455/450 |
| 2013/0028217 A1 | 1/2013 | Sumasu | H04J 11/0023 370/329 |
| 2013/0034070 A1 | 2/2013 | Seo | H04L 5/0082 370/329 |
| 2013/0044692 A1* | 2/2013 | Nory | H04L 5/0048 370/329 |
| 2013/0083769 A1* | 4/2013 | Qu | H04W 72/23 370/335 |
| 2013/0088949 A1 | 4/2013 | Zhang | H04W 72/04 370/208 |
| 2013/0094411 A1 | 4/2013 | Zhang | H04L 5/0048 370/281 |
| 2013/0114521 A1 | 5/2013 | Frenne | H04L 5/0053 370/329 |
| 2013/0121276 A1* | 5/2013 | Kim | H04L 1/00 370/329 |
| 2013/0250782 A1* | 9/2013 | Nimbalker | H04L 1/0038 370/252 |
| 2013/0250863 A1 | 9/2013 | Nogami et al. | |
| 2014/0185560 A1* | 7/2014 | Kim | H04L 5/0007 370/329 |
| 2014/0247775 A1 | 9/2014 | Frenne et al. | |

FOREIGN PATENT DOCUMENTS

| | | |
|---|---|---|
| CN | 101958737 A | 1/2011 |
| CN | 10998504 A | 3/2011 |
| CN | 102036297 A | 4/2011 |
| RU | 2341900 C2 | 12/2008 |
| WO | WO-2010/073488 A1 | 7/2010 |
| WO | WO-2010/088536 A1 | 8/2010 |
| WO | WO-2010088526 A1 | 8/2010 |
| WO | 2010/125798 A1 | 11/2010 |
| WO | WO-2011/018024 A1 | 2/2011 |
| WO | WO-2011/083990 A2 | 7/2011 |
| WO | WO-2011/085189 A1 | 7/2011 |

OTHER PUBLICATIONS

3GPP, "Interference Management for Heterogeneous Network," 3GPP Draft, RI-101106(RIM-PDCCH Interference Management for Heterogeneous-Network), 3rd Generation Partnership Project (3GPP), Mobile Competence Centre, 850, Route Des Lucioles, F-06921 Sophia-Antipolis Cedex, France, vol. RAN WG1, pp. 20100222-20100226 (Feb. 16, 2010).

Catt, et al., "DL Interference Mitigation via Direction Information in Het-Net." 3GPP Draft, R1-103497, 3rd Generation Partnership Project (GPP), Mobile Compelence Centre, 850, Route Des Lucioles, F-06921 Sophia-Antipolis Cedex, France, vol. RAN-WG1. 5 pages (Jun. 22, 2010).

China First Office Action issued in Chinese Patent Application No. 201610537087.5, dated Mar. 4, 2019, 25 pages.

Chinese Office Action and Search Report with partial translation issued in corresponding Chinese Application No. 201280002845.8, dated Feb. 25, 2015, 11 pages.

European Communication Pursuant to Article 94(3) EPC issued in European Patent Application No. 17177978.8, dated Oct. 4, 2019, 6 pages.

Extended European Search Report issued in European Patent Application No. 17177978.8, dated Aug. 9, 2017, 8 pages.

India Examination Report issued in Indian Patent Application No. 1535/CHENP/2013, dated Feb. 27, 2019, 19 pages.

International Search Report and Written Opinion issued by the Euroepan Patent Office as International Searching Authority for International Application No. PCT/JP2012/069523 dated Jul. 11, 2012 (12 pages).

Japanese Office Action issued by the Japan Patent Office for Japanese Application No. 2013-506023 dated Jan. 8, 2014 (3 pages).

NEC Group "On the use of DM RS ports/scrambling sequences for MU-MIMO", 3GPP TSG-RAN WG1 Meeting #61 R1-103056, Montreal, Canada, May 10-14, 2010. 6 pages.

Russian Decision on Grant issued in corresponding Russian Patent Application No. 2016103308, dated Feb. 17, 2017, 19 pages.

Indian Office Action for IN Application No. 201948000291 dated Mar. 23, 2021.

Ericsson, ST Ericsson, "Enhancements for UE specific control signaling," Tdoc R1-111332, 3GPP TSG-RAN WG1 #65, May 9-13, 2011. 3 pages.

Huawei, HiSilicon, "Investigation on downlink control channel and signaling enhancements," R1-111253, 3GPP TSG RAN WG1 meeting #65, May 9-13, 2011. 3 pages.

Motorola, "PDCCH signalling for carrier aggregation," R1-091943, 3GPP TSG RAN WG1 Meeting #56, May 4-8, 2009. 10 pages.

NEC Group, "Reference signals for demodulating R-PDCCH channel," R1-100309, TSG-RAN WG1#59Bis, Jan. 18-22, 2010. 5 pages.

Nokia, Nokia Siemens Networks, "On enhanced downlink control signalling for Rel-11," R1-111743, 3GPP TSG RAN WG1 Meeting #65, May 9-13, 2011. 3 pages.

NTT Docomo, "DL Control Channel Enhancement for DL MIMO in Rel-11," R1-111636, 3GPP TSG RAN WG1 Meeting #65, May 9-13, 2011. 6 pages.

Research In Motion, UK Limited, "PDCCH Enhancement Considerations," R1-111661, 3GPP TSG RAN WG1 Meeting #65, May 9-13, 2011. 4 pages.

(56) References Cited

OTHER PUBLICATIONS

Samsung, "Discussion on Downlink Control Channel Enhancement," R1-111471, 3GPP TSG-RAN1# 65 meeting, May 9-13, 2011. 4 pages.
ZTE, "Aspects on DL control signaling enhancements," R1-111521, TSG-RAN WG1 #65, May 9-May 13, 2011. 4 pages.

* cited by examiner

COMMUNICATION SYSTEM

CROSS-REFERENCE TO RELATED APPLICATIONS

The present application is a continuation application of U.S. patent application Ser. No. 16/893,736 filed on Jun. 5, 2020, which is a continuation application of U.S. patent application Ser. No. 14/993,636 filed on Jan. 12, 2016, which is issued as U.S. Pat. No. 10,716,103, which is a continuation application of U.S. patent application Ser. No. 13/818,294 filed on Feb. 21, 2013, which is issued as U.S. Pat. No. 9,271,272, which is a National Stage Entry of international application PCT/JP2012/069523 filed on Jul. 25, 2012, which claims the benefit of priority from UNITED KINGDOM Patent Application 1112752.9 filed on Jul. 25, 2011, the disclosures of all of which are incorporated in their entirety by reference herein.

TECHNICAL FIELD

The present invention relates to mobile communications devices and networks, particularly but not exclusively those operating according to the $3^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)).

BACKGROUND ART

It has been decided, as part of the 3GPP standardisation process, that downlink operation for system bandwidths beyond 20 MHz will be based on the aggregation of a plurality of component carriers at different frequencies. Such carrier aggregation can be used to support operation in a system both with and without a contiguous spectrum (for example, a non-contiguous system may comprise component carriers at 800 MHz, 2 GHz, and 3.5 GHz). Whilst a legacy mobile device may only be able to communicate using a single, backward compatible, component carrier, a more advanced multi-carrier capable terminal would be able to simultaneously use the multiple component carriers.

Carrier aggregation can be particularly beneficial in a heterogeneous network (HetNet), even when the system bandwidth is contiguous, and does not exceed 20 MHz because multiple carriers enable interference management between different power class cells as well as open access and closed subscriber group (CSG) cells. Long-term resource partitioning can be carried out by exclusively dedicating carriers to a certain power class of cell (Macro/Pico/CSG).

Further, the need for interference management between different cells operating on component carriers of the same frequency in co-incident or overlapping geographic areas has led to the development of extension carriers (which are not backwards compatible with legacy devices). Extension carriers may be used as a tool for carrier aggregation based HetNet operation and improved spectral efficiency. A multi-carrier capable base station is able to operate at least one of its carriers as an extension carrier, on which a control channel (e.g. a channel carrying resource scheduling information such as the Physical Downlink Control Channel (PDCCH)), a Common reference Signal (CRS) (sometimes referred to as a Cell-specific Reference Signal), and other information cannot be transmitted. More specifically, an extension carrier may not be used for transmission of any of the following:

- a Physical Downlink Control Channel (PDCCH);
- a Physical Hybrid ARQ Indicator Channel (PHICH);
- a Physical Control Format Indicator Channel (PCFICH);
- a Physical Broadcast Channel (PBCH);
- a Primary Synchronization Signal (PSS);
- a Secondary Synchronization Signal (SSS); or
- a Common Reference Signal/Cell-specific Reference Signal (CRS).

An extension carrier therefore comprises a carrier that cannot be operated as a single carrier (stand-alone) carrier, but must be a part of a component carrier set where at least one of the carriers in the set is a stand-alone-capable carrier, which can be used to transmit the scheduling information (and other control information) for the extension carrier.

Thus, when a first base station is operating a component carrier as an extension carrier, another base station may operate a component carrier of the same frequency to transmit a control channel, a CRS and other such information more reliably, in the same general geographic area as the first base station, without significant interference because there is no corresponding control channel, CRS and other such information on the extension carrier operated by the first base station.

However, in communication systems in which extension carriers are employed, the cross-carrier scheduling from the stand-alone (legacy) component carrier can cause an increase in control channel (PDCCH) blocking and control channel (PDCCH) capacity can become a limiting factor of system performance. This is because of the additional control channel signalling required to schedule resources on multiple component carriers.

DISCLOSURE OF INVENTION

The invention therefore aims to provide a mobile communication system, a mobile communication device, a communication node and associated methods which overcomes or at least mitigates the above issues.

According to one aspect of the present invention, there is provided communication apparatus for communicating with a plurality of mobile communication devices in a cellular communication system the communication apparatus comprising: means for operating at least one communication cell; means for communicating a plurality of subframes with each of a plurality of communication devices within the at least one cell, wherein: each sub-frame comprises a plurality of communication resources defining a control region for communicating a respective control channel and a plurality of communication resources defining a data region for communicating a respective data channel; and the communicating means is operable to communicate: a first control channel having a first reference signal pattern (which may also referred to as a 'sequence') in a control region of a first of the subframes; and a second control channel having a second reference signal pattern (sequence) in a control region of a second of the subframes, wherein the second reference signal pattern (sequence) is different from the first reference signal pattern (sequence).

The means for operating at least one communication cell may be operable to operate a first cell using a first component carrier and a second cell using a second component carrier, and the first subframe may be provided using the first component carrier and the second subframe may be provided using the second component carrier.

The second component carrier may be operated as an extension carrier. The first component carrier may be operated as a stand-alone carrier. The communicating means may be operable to focus the second control channel spatially in a direction of a specific communication device.

The communicating means may be operable to transmit the first control channel omnidirectionally throughout the at least one cell.

The communication apparatus may further comprise means for determining whether a specific communication device should receive a first control channel having the first reference signal pattern, or a second control channel having the second reference signal pattern.

The determining means may be operable to determine whether the specific communication device should receive the first control channel having the first reference signal pattern, or the second control channel having the second reference signal pattern, based on a location of the communication device.

The determining means determining means may be operable to determine whether the specific communication device should receive the first control channel having the first reference signal pattern, or the second control channel having the second reference signal pattern, based on the location of the communication device relative to further communication apparatus.

The determining means may be operable to determine the location of the communication device relative to the further communication apparatus based on a result of a measurement of a parameter representing a distance of the communication device from the further communication apparatus.

The parameter representing a distance of the communication device from the further communication apparatus may comprise a reference signal received power (RSRP) of a signal transmitted by the further communication apparatus.

The determining means may be operable to determine that the specific communication device should receive the first control channel having the first reference signal pattern if a predefined message has been received from the specific communication device.

The determining means may be operable to determine that the specific communication device should receive the second control channel having the second reference signal pattern if a further predefined message has been received from the specific communication device.

The determining means may be operable to determine whether the specific communication device should receive a the first control channel having the first reference signal pattern, or the second control channel having the second reference signal pattern, in dependence on a measurement report received from the specific communication device.

The communication apparatus may comprise a plurality of distributed antennas.

The communicating means may be operable to communicate the first control channel having a first reference signal pattern using any of the plurality of antennas.

The communicating means may be operable to communicate the second control channel having a second reference signal pattern using a subset comprising at least one, but not all, of the plurality of antennas.

The communicating means may be operable to communicate a control channel having a third reference signal pattern in a third of the subframes using a subset comprising at least one, but not all, of the plurality of antennas, wherein the third reference signal pattern may be different from first reference signal pattern and the second reference signal pattern.

The communicating means may be operable to communicate radio frames comprising a plurality of subfames, each subframe having a different respective subframe location, and wherein the communicating means may be operable: to communicate the first control channel having a first reference signal pattern in a subframe at a subframe location, within a radio frame, selected from a first set of subframe location(s) comprising at least one subframe location; and may be operable to communicate the second control channel having a second reference signal pattern in a subframe at a subframe location, within a radio frame, selected from a second set of subframe location(s) comprising at least one subframe location; wherein the first set of subframe location(s) may not comprise the same subframe location(s) as the second set of subframe location(s).

The first control channel having a first reference signal pattern may not be communicated in a subframe at a subframe location of a multi-media broadcast over a single frequency network (MBSFN) subframe and/or may not be communicated in a subframe at a subframe location of an almost blank subframe (ABS).

The second control channel having a second reference signal pattern may be communicated in a subframe at a subframe location of a multi-media broadcast over a single frequency network (MBSFN). The second control channel having a second reference signal pattern may be communicated in a subframe of an almost blank subframe (ABS).

Control information communicated using the first and/or the second may represent a resource allocation for a communication device. Each reference signal pattern may comprise a demodulation reference signal pattern 'DMRS'.

According to one aspect of the present invention, there is provided a communication device for communicating with communication apparatus of a cellular communication system said communication device comprising: means for registering said communication device in at least one communication cell operated by said communication apparatus; means for receiving a plurality of sub-frames from said communication apparatus, wherein: each sub-frame comprises a plurality of communication resources defining a control region for communicating a respective control channel and a plurality of communication resources defining a data region for communicating a respective data channel; and said receiving means is operable: to receive a first control channel having a first reference signal pattern in a control region of a first of said subframes; and to receive a second control channel having a second reference signal pattern in a in a control region of a second of said subframes, wherein said second reference signal pattern may be different from said first reference signal pattern; and means for interpreting control information communicated in said first control channel having a first reference signal pattern, and for interpreting control information communicated in said second control channel having a second reference signal pattern.

The receiving means may be operable to receive the first subframe on a first component carrier of a first frequency band and the second subframe on a the second component carrier of a second frequency band. The second component carrier may be operated as an extension carrier. The first component carrier may be operated as a stand-alone carrier.

The receiving means may be operable to receive the second control channel in a radio beam focussed spatially in a direction of the communication device.

The receiving means may be operable to receive the first control channel in a radio communication transmitted omnidirectionally throughout the at least one cell.

The communication device may further comprise means for measuring a parameter representing a distance of the communication device from further communication apparatus.

The parameter representing a distance of the communication device from the further communication apparatus may comprise a reference signal received power (RSRP) of a signal transmitted by the further communication apparatus.

The communication device may further comprise means for transmitting a predefined message to the communication apparatus operating the cell in dependence on a result of the measurement of the parameter representing a distance of the communication device from the further communication apparatus.

The predefined message may comprise a measurement report including the result of the measurement.

The predefined message may comprise information representing an identity of the further communication apparatus and/or of a cell operated by the further communication apparatus.

The communication device may further comprise means for comparing the parameter against a predetermined threshold value.

The transmitting means may be operable to transmit the predefined message if the comparison indicates that the parameter has risen above the threshold value.

The transmitting means may be operable to transmit a further predefined message if the comparison indicates that the parameter has fallen below the threshold value.

The receiving means may be operable to receive radio frames comprising a plurality of subfames, each subframe having a different respective subframe location within the radio frame, and wherein the receiving means may be operable: to receive a first control channel having a first reference signal pattern in a subframe at a subframe location, within a radio frame, selected from a first set of subframe location(s) comprising at least one subframe location; and may be operable to receive a second control channel having a second reference signal pattern in a subframe at a subframe location, within a radio frame, selected from a second set of subframe location(s) comprising at least one subframe location; wherein the first set of subframe location(s) may not comprise the same subframe location(s) as the second set of subframe location(s).

The first control channel having a first reference signal pattern may not be received in a subframe at a subframe location of a multi-media broadcast over a single frequency network (MBSFN) and/or may not be received in a subframe at a subframe location of an almost blank subframe (ABS). The second control channel having a second reference signal pattern may be received in a subframe at a subframe location of a multi-media broadcast over a single frequency network (MBSFN). The second control channel having a second reference signal pattern may be received in a subframe of an almost blank subframe (ABS).

The control information communicated using the first and/or the second may represent a resource allocation for the communication device.

The reference signal pattern may comprise a demodulation reference signal pattern 'DMRS'.

According to one aspect of the present invention, there is provided a method, performed by communication apparatus, of communicating with a plurality of mobile communication devices in a cellular communication system the method comprising: operating at least one communication cell; communicating a plurality of subframes with each of a plurality of communication devices within the at least one cell, wherein each sub-frame comprises a plurality of communication resources defining a control region for communicating a respective control channel and a plurality of communication resources defining a data region for communicating a respective data channel; communicating control information using a first control channel having a first reference signal pattern in a control region of a first of the subframes; and communicating control information using a second control channel having a second reference signal pattern in a control region of a second of the subframes, wherein the second reference signal pattern is different from the first reference signal pattern.

According to one aspect of the present invention, there is provided a method, performed by a communication device, of communicating with communication apparatus of a cellular communication system the method:
registering the communication device in at least one communication cell operated by the communication apparatus;
receiving a plurality of sub-frames from the communication apparatus, wherein each sub-frame comprises a plurality of communication resources defining a control region for communicating a respective control channel and a plurality of communication resources defining a data region for communicating a respective data channel; receiving a first control channel having a first reference signal pattern in a control region of a first of the subframes; interpreting control information communicated in the first control channel having a first reference signal pattern; receiving a second control channel having a second reference signal pattern in a in a control region of a second of the subframes, wherein the second reference signal pattern is different from the first reference signal pattern; and interpreting control information communicated in the second control channel having a second reference signal pattern.

According to one aspect of the present invention, there is provided a computer program product comprising instructions operable to program a programmable processor to implement communication apparatus or a communication device according as recited above.

According to one aspect of the present invention, there is provided communication apparatus for communicating with a plurality of mobile communication devices in a cellular communication system the communication apparatus comprising: means for operating at least one communication cell; means for communicating a plurality of subframes with each of a plurality of communication devices within the at least one cell, wherein: each sub-frame comprises a plurality of communication resources defining a control region for communicating a respective control channel and a plurality of communication resources defining a data region for communicating a respective data channel; and the communicating means may be operable to communicate: control information using a first control channel having a first reference signal pattern in a control region of a first of the subframes; and control information using a second control channel having a second reference signal pattern in one of the control and data regions of a second of the subframes, wherein the second reference signal pattern is different from the first reference signal pattern.

According to one aspect of the present invention, there is provided a communication device for communicating with communication apparatus of a cellular communication system the communication device comprising: means for registering the communication device in at least one communication cell operated by the communication apparatus; means for receiving a plurality of sub-frames from the communication apparatus, wherein: each sub-frame comprises a plurality of communication resources defining a control region for communicating a respective control channel and a plurality of communication resources defining a data region for communicating a respective data channel; and the receiving means is operable: to receive a first control channel having a first reference signal pattern in a control region of a first of the subframes; and to receive a second control channel having a second reference signal pattern in at least one of a control region and a data region of a second of the subframes, wherein the second reference signal pattern may be different from the first reference signal pattern; and means for interpreting control information communicated in the first control channel having a first reference signal pattern, and for interpreting control information communicated in the second control channel having a second reference signal pattern.

According to one aspect of the present invention, there is provided a communication apparatus for communicating with a plurality of mobile communication devices in a cellular communication system the communication apparatus comprising: means for operating at least one communication cell; means for communicating a plurality of sub-frames with each of a plurality of communication devices within the at least one cell, wherein: the communicating means is operable to communicate: control information using a first control channel omnidirectionally throughout the cell; and control information using a second control channel in a direction spatially focussed towards a communication device for which the control information is intended.

According to one aspect of the present invention, there is provided a communication device for communicating with communication apparatus of a cellular communication system the communication device comprising: means for registering the communication device in at least one communication cell operated by the communication apparatus; means for receiving a plurality of sub-frames from the communication apparatus, wherein: the receiving means may be operable: to receive a first control channel omnidirectionally by the communication apparatus throughout the cell; and to receive a second control channel transmitted in a direction spatially focussed towards the communication device; and means for interpreting control information communicated in the first control channel, and for interpreting control information communicated in the second control channel.

According to one aspect of the present invention, there is provided communication apparatus for communicating with a plurality of mobile communication devices in a cellular communication system the communication apparatus comprising: a cell controller adapted to operate at least one communication cell; a transceiver operable to communicate a plurality of subframes with each of a plurality of communication devices within the at least one cell, wherein: each sub-frame comprises a plurality of communication resources defining a control region for communicating a respective control channel and a plurality of communication resources defining a data region for communicating a respective data channel; and the transceiver is may be further operable to communicate: control information using a first control channel having a first reference signal pattern in a control region of a first of the subframes; and control information using a second control channel having a second reference signal pattern in at least one of the control and data regions of a second of the subframes, wherein the second reference signal pattern is different from the first reference signal pattern.

According to one aspect of the present invention, there is provided a communication device for communicating with communication apparatus of a cellular communication system the communication device comprising: a cell registration module operable to register the communication device in at least one communication cell operated by the communication apparatus; a transceiver operable to receive a plurality of sub-frames from the communication apparatus, wherein: each sub-frame comprises a plurality of communication resources defining a control region for communicating a respective control channel and a plurality of communication resources defining a data region for communicating a respective data channel; and the transceiver is further operable: to receive a first control channel having a first reference signal pattern in a control region of a first of the subframes; and to receive a second control channel having a second reference signal pattern in at least one of the control region and the data region of a second of the subframes, wherein the second reference signal pattern is different from the first reference signal pattern; and a processor operable to interpret control information communicated in the first control channel having a first reference signal pattern, and to interpret control information communicated in the second control channel having a second reference signal pattern.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described by way of example only with reference to the attached figures in which.

DETAILED DESCRIPTION OF EXEMPLARY EMBODIMENTS

Overview

Figure 1:
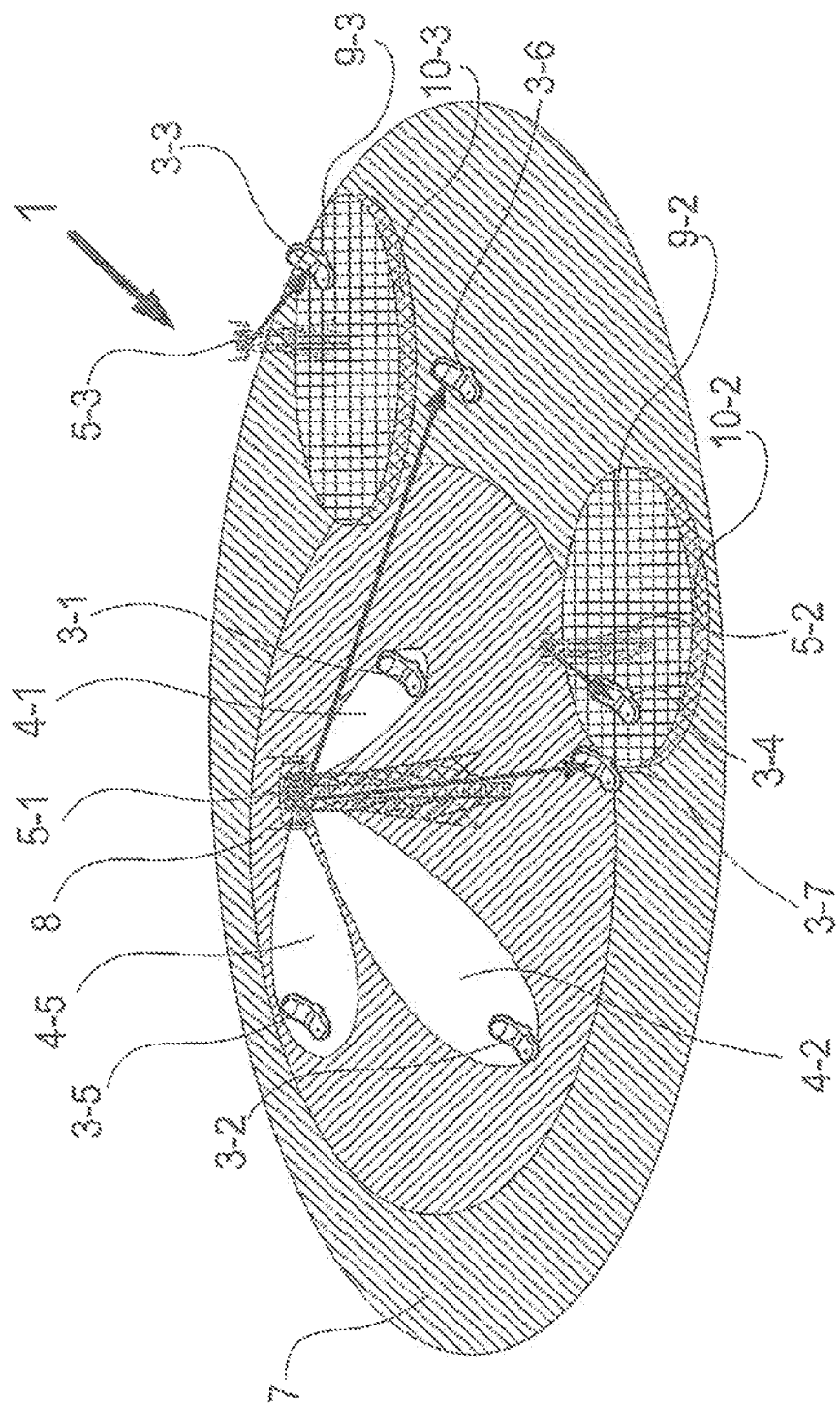
FIG. 1 schematically illustrates a telecommunication system.

FIG. 1 schematically illustrates a mobile (cellular) telecommunication system 1 in which a user of any of a plurality of mobile communication devices 3-1 to 3-7 can communicate with other users via one or more of a plurality of base stations 5-1, 5-2 and 5-3. In the system illustrated in FIG. 1, each base station 5 shown is an Evolved Universal Terrestrial Radio Access Network (E-UTRAN) base station capable of operating in a multi-carrier environment.

In FIG. 1, the base station labelled 5-1 comprises a so called 'macro' base station operating a plurality of relatively geographically large 'macro' cells 7, 8 using respective component carriers (CCs) C1, C2, of a component carrier set. In this embodiment, the macro base station 5-1 operates component carrier C1 as a primary component carrier on which a primary cell (PCell) 7 is provided, and component carrier C2 as a secondary component carrier on which a secondary cell (SCell) 8 is provided. The PCell 7 has a larger geographical coverage than the SCell 8. The difference in the size of the PCell 7 and SCell 8 may be by design (e.g. as a result of using a lower transmit power for component carrier C2) or may result from one or more radio environmental factors affecting the primary carrier C1 and secondary carrier C2 to different extents (e.g. path loss affecting a lower frequency primary carrier C1 to a lesser extent than a higher frequency secondary carrier C2).

The other base stations 5-2, 5-3 shown in FIG. 1 each comprises a so called 'pico' base station operating a plurality of 'pico' cells 9-2, 9-3, 10-2, 10-3, using a component carrier set having component carriers (CCs) C1, C2 corresponding in frequency to those used by the macro-base station 5-1. Each pico base station 5-2, 5-3 operates a respective pico primary cell (PCell) 9-2, 9-3 on component carrier C2 and a respective pico secondary cell (SCell) 10-2, 10-3 on component carrier C1. Thus, the pico Pcells 9 share substantially the same frequency band as the macro Scell 8, and the pico Scells 10 share substantially the same frequency band as the macro Pcell 7. As seen in FIG. 1, the power of the carriers C1, C2 used to provide the pico cells 9, 10 is set such that the geographical coverage of the pico PCells 9, of this example, are substantially co-incident with the geographical coverage of the pico SCells 10.

The power used to provide pico cells 9, 10 is low relative to the power used for the macro cells 7, 8 and the pico cells 9, 10 are therefore small relative to the macro cells 7, 8. As shown in FIG. 1, in this example the geographical coverage of each of the pico cells 9, 10 falls completely within the geographical coverage of the macro PCell 7 and overlaps partially with the geographical coverage of the macro SCell 8.

Figure 2:
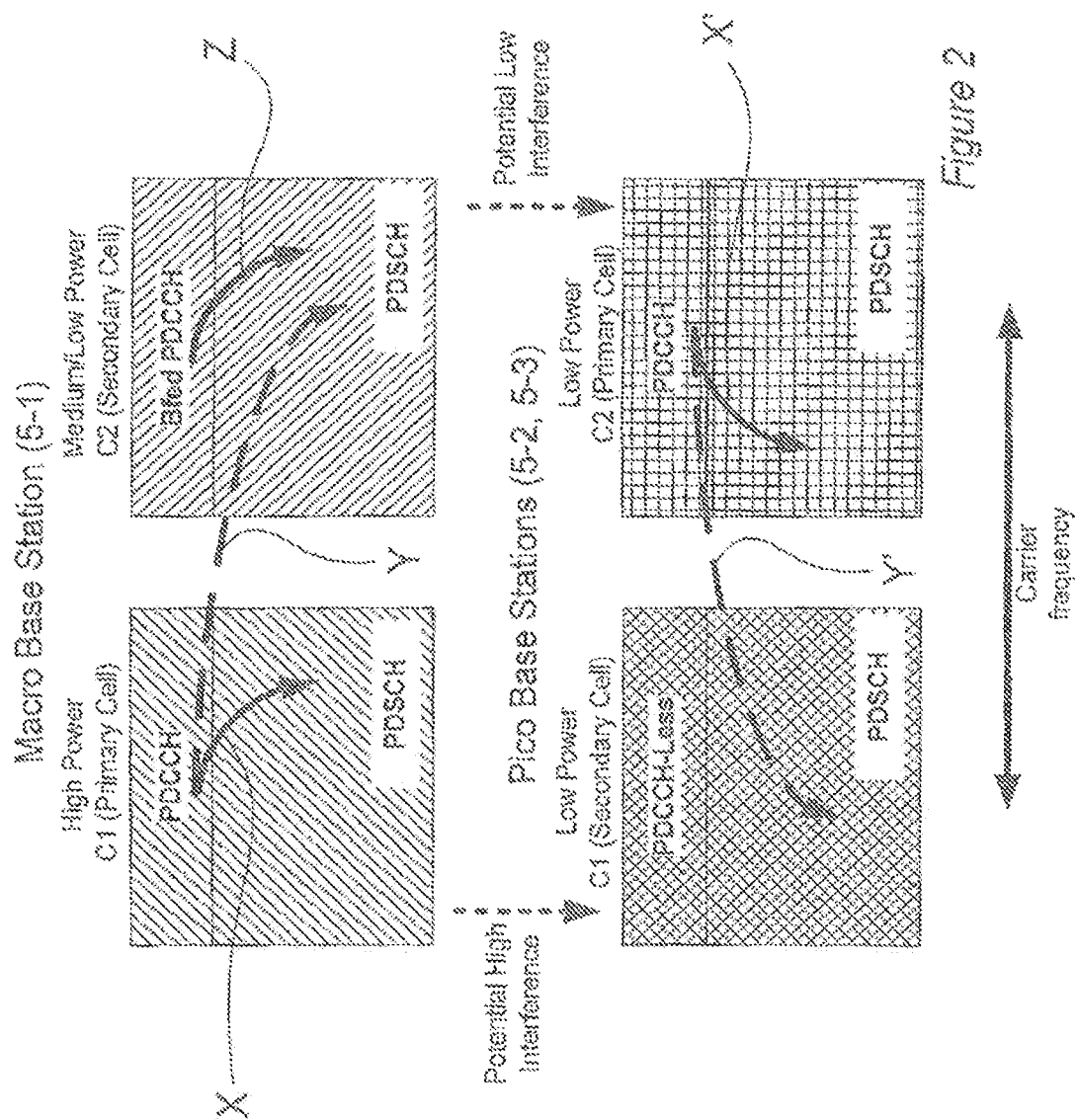
FIG. 2 illustrates a possible subframe configuration for component carriers for the telecommunication system of FIG. 1.

Referring to FIG. 2, in which the subframe configuration for the component carriers for each of the cells is illustrated, it will be apparent that there is a potential for relatively high communication interference between the macro PCell 7 and each of the pico SCells 10. The risk of interference is high because the macro PCell 7 and pico SCells 10 operate in co-incident geographical regions and use a common component carrier frequency. Further, the strength of communication signals from the macro base station 5-1, in the geographical area covered by each pico Scell 10, may be comparable to communication signals from the respective pico base station 5-2, 5-3 because of the relatively high power used by the macro base station 5-1 compared to that used by the pico base stations 5-2, 5-3. Whilst there is also the potential for some interference between the macro SCell 8 and each of the pico PCells 9, any such interference is likely to be relatively small and restricted to the relatively small geographical region in which the macro SCell 8 and pico PCells 9 overlap.

In order to alleviate the issue of interference, the component carrier C2 used for the macro Scell 8 is operated by the macro base station 5-1 as an extension carrier on which the nature of information that may be transmitted is restricted. Specifically, the component carrier, when operating as the extension carrier may not be used for transmission of any of the following: [0089] a Physical Downlink Control Channel (PDCCH); [0090] a Physical Hybrid ARQ Indicator Channel (PHICH); [0091] a Physical Control Format Indicator Channel (PCFICH); [0092] a Physical Broadcast Channel (PBCH); [0093] a Primary Synchronization Signal (PSS); [0094] a Secondary Synchronization Signal (SSS); or [0095] a Common Reference Signal/Cell-specific Reference Signal (CRS).

The macro base station 5-1 operates carrier C1 for the PCell 7 as a stand-alone carrier having a Physical Downlink Control Channel (PDCCH), which can be used to schedule the resources of its own component carrier C1 (as shown by arrow X). The PDCCH of component carrier C1 can also be used to schedule the resources of component carrier C2 ('cross carrier scheduling') to be used for communication purposes by a mobile communication device 3 when operating in the macro Scell 8 (as shown by arrow Y). The PDCCH is transmitted omnidirectionally throughout the cell.

The respective component carrier C1 used for each of the pico SCells 10 is also operated as an extension carrier by the associated pico base station 5-2, 5-3. The respective component carrier C2 used for each of the pico Pcells 9 is operated, by the associated pico base station 5-2, 5-3, as a stand-alone carrier having an associated PDCCH for scheduling resources within its own component carrier C2 (as shown by arrow X'). This PDCCH can also be used for cross carrier scheduling resources of component carrier C1 to be used for communication purposes by a mobile communication device 3 when operating in the associated pico Scell 10 (as shown by arrow Y').

As illustrated in FIGS. 1 and 2, in this embodiment whilst a conventional PDCCH is not provided on the extension carriers, a dedicated Beamformed Physical Downlink Control Channel (BFed PDCCH) 4-1, 4-2, 4-5 is provided using the extension component carrier C2 of the macro SCell 8. The BFed PDCCH 4-1, 4-2, 4-5 is directional and can be used selectively to schedule resources of the extension component carrier C2 for the macro SCell 8 (as shown by arrow Z) for specific mobile communication devices 3. The BFed PDCCH is used in conjunction with frequency selective scheduling in which the mobile communication device reports the channel state information (CSI) such as channel quality indicator (CQI) for each resource block (RB) or group of RBs in frequency domain of the system bandwidth and the base station selects the best resource blocks to use to schedule the BFed PDCCH for each terminal.

In this exemplary embodiment, a BFed PDCCH is not provided for the extension component carrier C1 of the pico SCells 10-2, 10-3. Instead each pico base station 5-2, 5-3 operates its respective extension component carrier C1 as a completely PDCCH-less component carrier as shown in FIG. 2.

The PDCCH of the primary component carrier C1, operated by the macro base station 5-1, can thus be used for scheduling resources (e.g. as shown by arrow Y) for a mobile communication device 3-7, located in the macro SCell 8, but which is in geographical close proximity to a pico PCell 9-2 being operated on the same component carrier C2 as the macro SCell 8. Accordingly, interference between the macro SCell 8 and the pico PCell 9-2 is avoided because, although the macro SCell 8 and the pico PCell 9-2 are being operated using same component carrier frequency band (C2), the control information for each cell is transmitted using a different respective component carrier frequency band.

The BFed PDCCH 4-1, 4-2, 4-5 of the extension component carrier C2 for macro SCell 8 can be used selectively to schedule resources for a respective mobile communication device 3-1, 3-2, 3-5, operating within the macro SCell 8, but which is not geographically close to one of the pico PCells 9-2, 9-3. Accordingly, where interference is not such a significant risk, the capacity of the PDCCH of the component carrier C1 used for the macro Pcell 7 can, beneficially, be conserved without significantly affecting interference.

For the smaller pico cells in which control channel capacity is not such an issue, the PDCCH of the respective component carrier C2 operated by each pico base station 5-2, 5-3, can be used for the cross carrier scheduling of resources for any mobile communication device 3-3, 3-4 located in the respective pico SCell 10-2, 10-3. As described above, the pico cells are geographically located entirely within the region covered by the macro PCell 7. Accordingly, the absence of a BFed PDCCH, for the component carrier C1 operated by each pico base station 5-2, 5-3, avoids the interference that could otherwise potentially result with the PDCCH of the macro PCell's component carrier C1.

Beamformed Physical Downlink Control Channel (BFed PDCCH)

A possible implementation of a BFed PDCCH will now be described, in more detail.

The beamforming of the BFed PDCCH 4-1, 4-2, 4-5 is achieved using a multi-layer beamforming approach that is suitable for a multiple input multiple output (MIMO) based communication system in which the transmitters and the receivers of the signals have multiple antennas. Beamforming is achieved using a precoding technique in which the phase (and possibly gain) of each stream of signals transmitted from each of a plurality of antennas is independently weighted such that the power of each signal stream is focussed in the direction of interest (e.g. that of the mobile communication device for which the BFed PDCCH is intended) to maximise the signal level. Similarly, the power of each stream of signals is minimised in other directions, including directions in which interference is a potential issue (e.g. that of the pico cells 9, 10).

In order to beamform successfully, the state of the channel is analysed based on Channel State Information (CSI) measured by the mobile communication devices 3 and reported to the macro base station 5-1. The CSI comprises information such as a rank indicator (RI), precoding matrix indicator (PMI), a channel quality indicator (CQI) and/or the like. Based on this information, an appropriate type of beamforming is selected. For example, where full CSI is reliably available a statistical eigenvector beamforming technique may be used. In situations where a more limited CSI is available, an interpolation technique may be used estimate the CSI for beamforming. In situations where no CSI is available the CSI may be estimated blindly at the base station, for example from received signal statistics or uplink signals received from the terminal.

Figure 3:
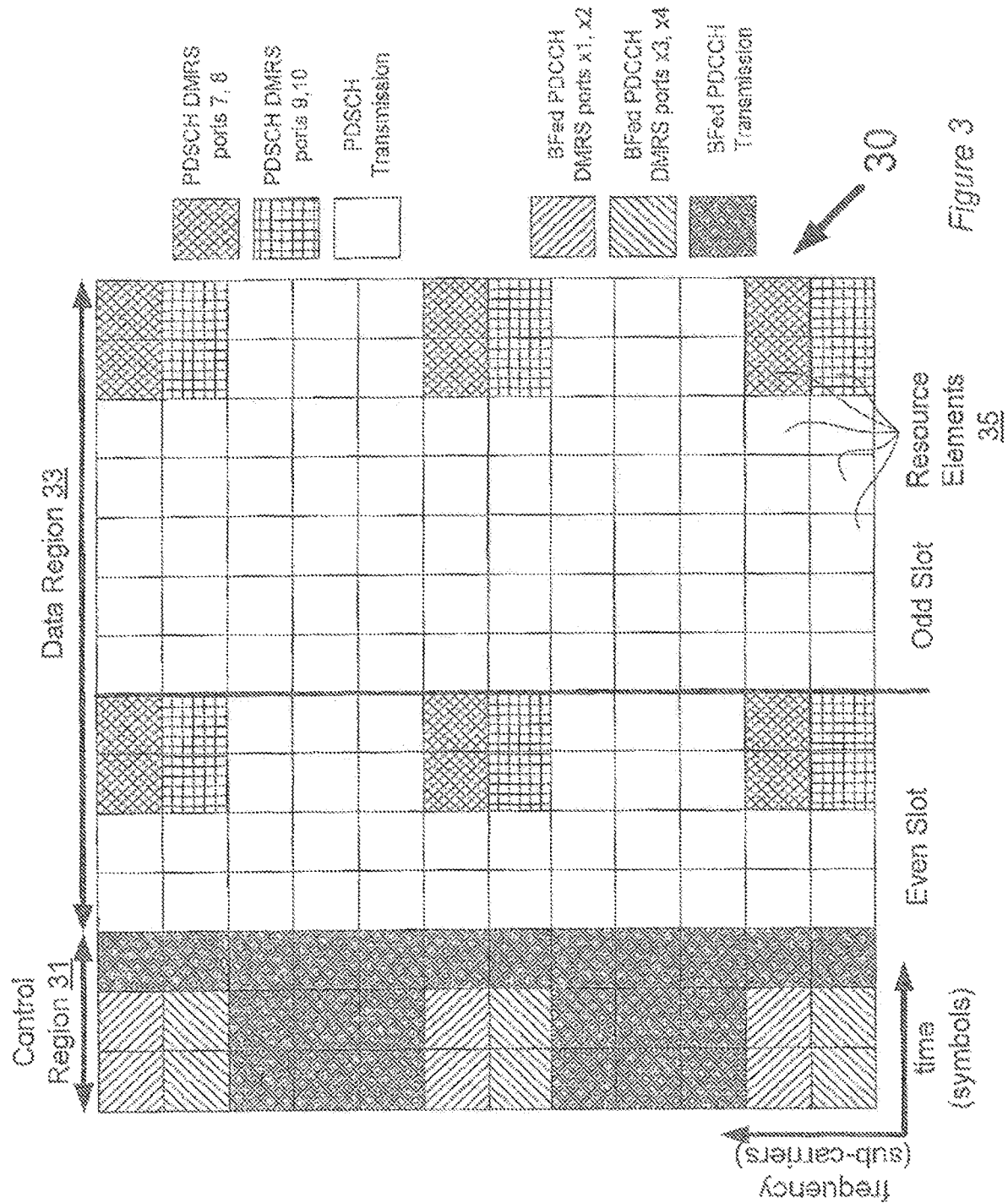
FIG. 3 shows a simplified illustration of a resource grid for demodulation reference signals in the telecommunication system of FIG. 1.

FIG. 3 shows a resource grid for an orthogonal frequency division multiplexing (OFDM) subframe 30 for the communication system 1 of FIG. 1, in which a BFed PDCCH is provided. The resource grid shown is for a resource block (RB) pair each RB having, for example, a resource grid similar to that described in section 6.2 of the $3^{rd}$ Generation Partnership Project (3GPP) Technical Standard (TS) 36.211 V10.2.0 and shown in FIG. 6.2.2-1 of that standard.

As seen in FIG. 3, the BFed PDCCH transmission is provided in a set of resource elements 35 in a control region 31 of the subframe 30. The control region 31 comprises resource elements 35 of the first three OFDM symbols of the first slot of the subframe 30, and spans all twelve subcarrier frequencies of one resource block (RB). The remaining resource elements 35 of the first slot and the resource elements 35 of the second slot form a data region 33 in which the Physical Downlink Shared Channel (PDSCH) is transmitted. A set of UE specific PDSCH demodulation reference signals (DMRS) and UE specific BFed PDCCH DMRS are provided in the data region 33 and control region 31 respectively as illustrated.

The DMRS pattern for the BFed PDCCH is different to that used for a legacy PDCCH. In the DMRS pattern shown in FIG. 3, PDSCH DMRS for antenna ports 7 and 8 are transmitted in resource elements 35 at three evenly distributed subcarrier frequencies, in each of the last two symbols of the first slot and in each of the last two symbols of the second slot. PDSCH DMRS for antenna ports 9 and 10 are also transmitted in resource elements 35 at three evenly distributed subcarrier frequencies (different to those used for ports 7 and 8), in each of the last two symbols of the first slot and in each of the last two symbols of the second slot. BFed PDCCH DMRS for antenna ports x1 and x2 are transmitted in resource elements 35 at three evenly distributed subcarrier frequencies, in each of the first two symbols of the first slot. BFed PDCCH DMRS for antenna ports x3 and x4 are transmitted in resource elements 35 at three evenly distributed subcarrier frequencies (different to those used for ports x3 and x4), in each of the first two symbols of the first slot.

Macro Base Station

Figure 4:
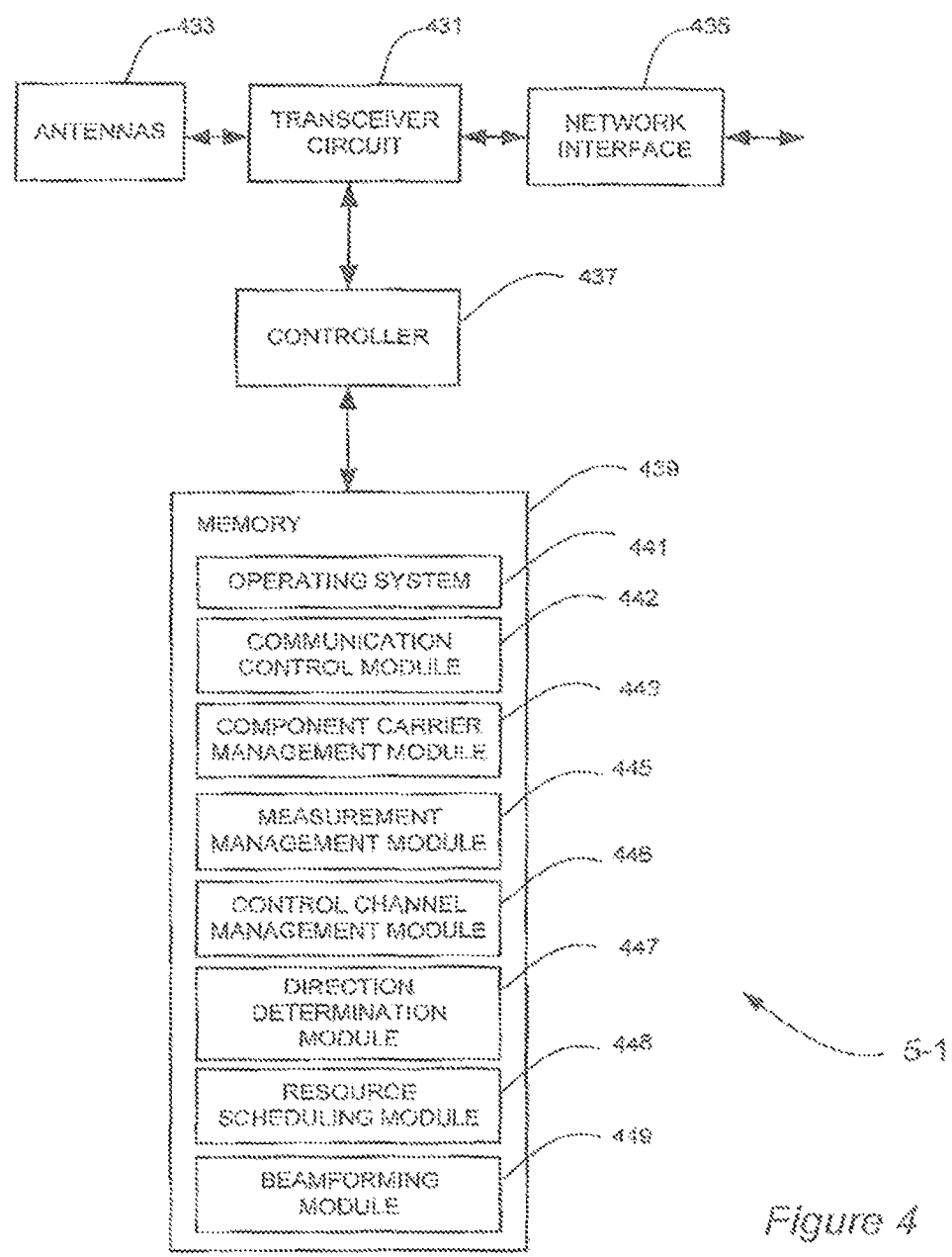
FIG. 4 shows a simplified block diagram of a first base station for the telecommunication system of FIG. 1.

FIG. 4 is a block diagram illustrating the main components of the macro base station 5-1 shown in FIG. 1. The macro base station 5-1 comprises an E-UTRAN multi-carrier capable base station comprising a transceiver circuit 431 which is operable to transmit signals to, and to receive signals from, the mobile communication devices 3 via a plurality of antennas 433. The base station 5-1 is also operable to transmit signals to and to receive signals from a core network via a network interface 435. The operation of the transceiver circuit 431 is controlled by a controller 437 in accordance with software stored in memory 439.

The software includes, among other things, an operating system 441, a communication control module 442, a component carrier management module 443, a measurement management module 445, a control channel management module 446, a direction determination module 447, a resource scheduling module 448, and a beamforming module 449.

The communication control module 442 is operable to control communication with the mobile communication devices 3 on the component carriers (CCs) C1, C2, of its component carrier set. The component carrier management module 443 is operable to manage the use of the component carriers C1, C2 and, in particular, the configuration and operation of the macro PCell 7 and macro SCell 8 and the operation of the secondary component carrier C2 for the SCell 8 as an extension carrier. The measurement management module 445 communicates with the mobile communication device 3 to configure the mobile communication device 3 to initiate measurement of the CSI and to receive and analyse measurement reports received from the mobile communication devices 3 to assess the channel state for the purposes of beamforming. The direction determination module 447 determines the directional position of a mobile communication device 3, relative to the base station 5-1, for beamforming purposes, from the uplink signals that the base station 5-1 receives from that mobile communication device 3. The resource scheduling module 448 is responsible for scheduling the resources of the primary and extension component carrier C1, C2 to be used by the mobile communication devices 3 operating in the macro cells 7, 8. The beamforming module 449 manages the formation of the directional 'beam' via which the BFed PDCCH 4-1, 4-2, 4-5 is provided to the respective mobile communication devices 3-1, 3-2, 3-5.

In this exemplary embodiment, the control channel management module 446 determines which control channel to use for scheduling resources of the extension carrier C2 of the macro SCell 8 based on trigger messages received from the mobile communication device 3. These trigger messages indicate either that a mobile communication device is within range of a pico base station 5-2, 5-3 or that a mobile communication device 3 is no longer within range of a pico base station 5-2, 5-3.

Specifically, if a mobile communication device 3 has not issued a trigger message indicating that it is within range of a pico base station 5-2, 5-3, or if it has issued a trigger message indicating that it is no longer within range of a pico base station 5-2, 5-3, then the control channel management module 446 determines that the mobile communication device 3 should receive resource scheduling for the extension carrier C2 of the macro SCell 8 via a BFed PDCCH provided on the extension component carrier C2.

If a mobile communication device 3 has issued a trigger message indicating that it is within range of a pico base station 5-2, 5-3, then the control channel management module 446 determines that the mobile communication device 3 should receive resource scheduling for the extension carrier C2 of the macro SCell 8 via a PDCCH provided on the primary component carrier C1 of the macro PCell 7.

In the above description, the base station 5-1 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Pico Base Station

Figure 5:
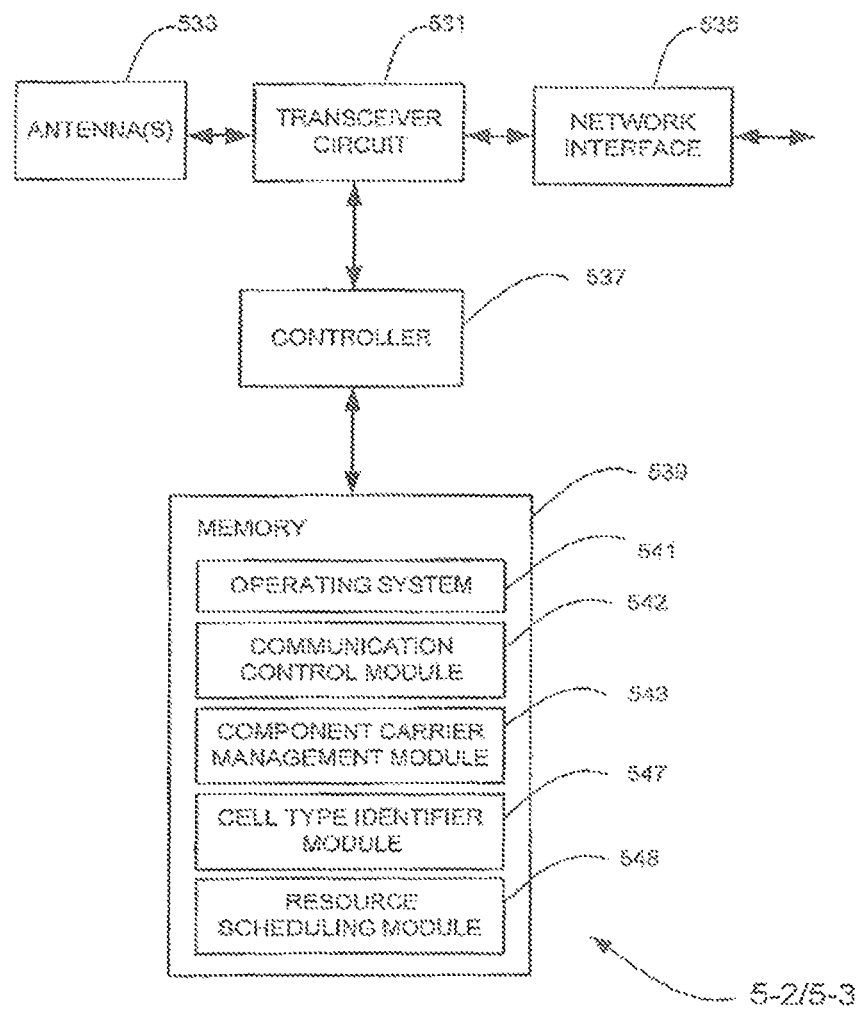
FIG. 5 shows a simplified block diagram of a second base station for the telecommunication system of FIG. 1.

FIG. 5 is a block diagram illustrating the main components of a pico base station 5-2, 5-3 shown in FIG. 1. Each pico base station 5-2, 5-3 comprises an E-UTRAN multi-carrier capable base station comprising a transceiver circuit 531 which is operable to transmit signals to, and to receive signals from, the mobile communication devices 3 via at least one antenna 533.

The base station 5-2, 5-3 is also operable to transmit signals to and to receive signals from a core network via a network interface 535. The operation of the transceiver circuit 531 is controlled by a controller 537 in accordance with software stored in memory 539.

The software includes, among other things, an operating system 541, a communication control module 542, a component carrier management module 543, a cell type identifier module 547 and a resource scheduling module 548.

The communication control module 542 is operable to control communication with the mobile communication devices 3 on the component carriers (CCs) C1, C2, of its component carrier set. The component carrier management module 543 is operable to manage the use of the component carriers C1, C2 and in particular the configuration and operation of the pico PCell 9 and pico SCell 10 and the operation of the secondary component carrier C1 for the SCell 10 as an extension carrier. The cell type identifier module 547 provides information for identifying the cells controlled by the base station 5-2, 5-3 as pico cells 9, 10. This information is provided to mobile communication devices 3 that come within (or close to) the coverage area of the pico Pcell 9. In this exemplary embodiment, for example, the cell type identifier module 547 broadcasts information identifying the cells it controls to be pico cells. The resource scheduling module 548 is responsible for scheduling the resources of the primary and extension component carrier C2, C1 to be used by the mobile communication devices 3 operating in the pico cells 9, 10.

In the above description, the base station 5-2, 5-3 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Mobile Communication Device

Figure 6:
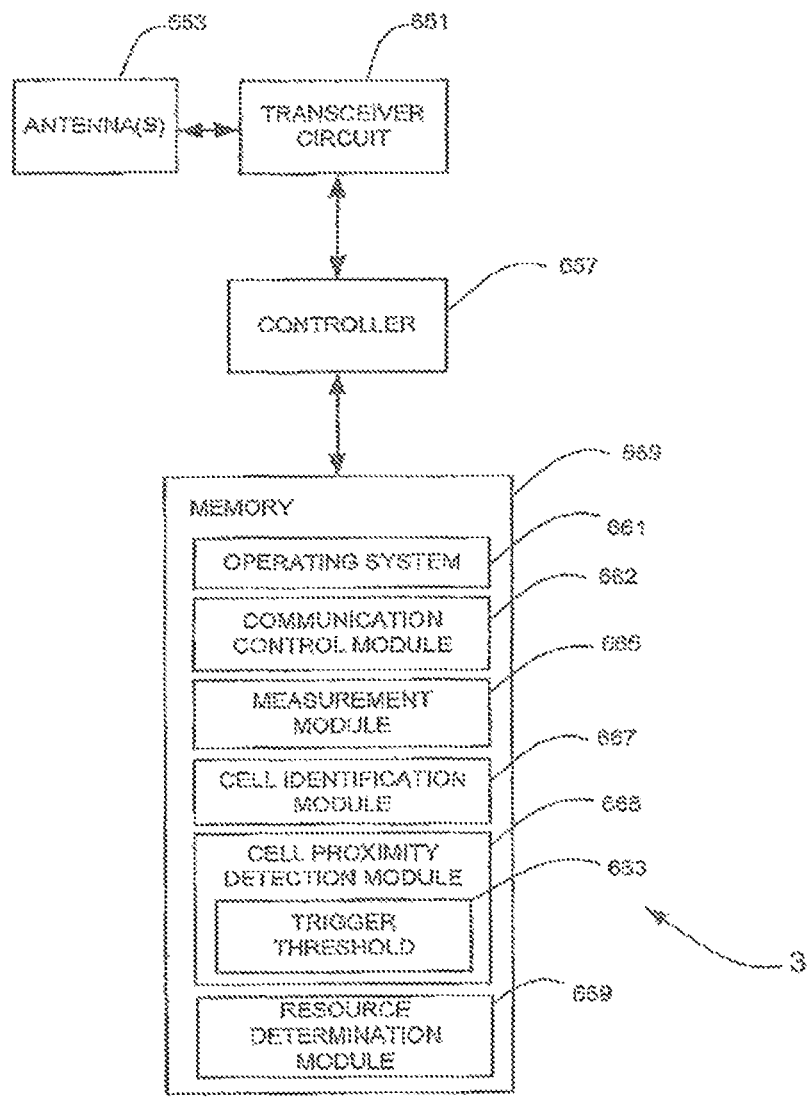
FIG. 6 shows a simplified block diagram of a mobile communication device for the telecommunication system of FIG. 1.

FIG. 6 is a block diagram illustrating the main components of the mobile communication devices 3 shown in FIG. 1. Each mobile communication device 3 comprises a mobile (or 'cell' telephone) capable of operating in a multi-carrier environment. The mobile communication device 3 comprises a transceiver circuit 651 which is operable to transmit signals to, and to receive signals from, the base stations 5 via at least one antenna 653. The operation of the transceiver circuit 651 is controlled by a controller 657 in accordance with software stored in memory 659.

The software includes, among other things, an operating system 661, a communication control module 662, a measurement module 665, and a cell identification module 667, a cell proximity detection module 668, and a resource determination module 669.

The communication control module 662 is operable for managing communication with the base stations 5 on the associated component carriers (CCs) C1, C2. The measurement module 665 receives measurement configuration information from the base station 5-1 for the purposes of configuring the mobile communication device 3 to take measurements of the CSI. The measurement module 665 manages performance of the measurements of CSI (e.g. for the macro cells 7, 8), generates associated measurement reports and transmits the generated reports to the macro base station 5-1. The measurement module 665 also determines reference signal received power (RSRP) for the pico cells 9, 10 for use in determining the proximity of the mobile communication device 3 to the pico cells. The cell identification module 667 is operable to determine the type of cell, which the mobile communication device 3 enters, or comes geographically close to, from information provided by the base station 5-2, 5-3, controlling that cell. In this exemplary embodiment, for example, the cell identification module 667 is operable to receive the information for identifying the cell type that is broadcast by a pico base station 5-2, 5-3, and to identify the cell type to be a pico cell from the received information.

The cell proximity detection module 668 uses the measurements of RSRP from the pico Pcells 9 to determine the proximity of the mobile communication device 3 to the pico Pcells 9 by comparing the RSRP measurement to a predetermined 'trigger' threshold 663. The trigger threshold is set such that an RSRP above the trigger threshold indicates that the mobile communication device 3 is in a geographical location that is close enough to a pico Pcell 9 for there to be a risk of associated control channel interference between the PDCCH on the primary carrier (C2) of the pico PCell 9 and the BFed PDCCH on the extension carrier C2 of the macro SCell 8

Hence, if the RSRP measurement exceeds the threshold value, then the mobile communication device 3 is deemed to be sufficiently close to (or within) the pico cell for there to be a risk of interference between any BFed PDCCH transmitted on the extension carrier C2 of the macro SCell 8 with the PDCCH of transmitted on the extension carrier C2 of the pico PCell 9. When the trigger threshold 663 is exceeded, the cell proximity detection module 668 triggers a message to the macro base station 5-1 indicating that the mobile communication device is within range of a pico base station 5-2, 5-3. When the RSRP measurement drops below the trigger threshold 663, the cell proximity detection module 668 triggers a message to the macro base station 5-1 indicating that the mobile communication device is no longer within range of a pico base station 5-2, 5-3.

The resource determination module 669 determines the resources scheduled for use by the mobile communication devices 3 for communication purposes by decoding the PDCCH and/or BFed PDCCH appropriately.

In the above description, the mobile communication device 3 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Figure 7:
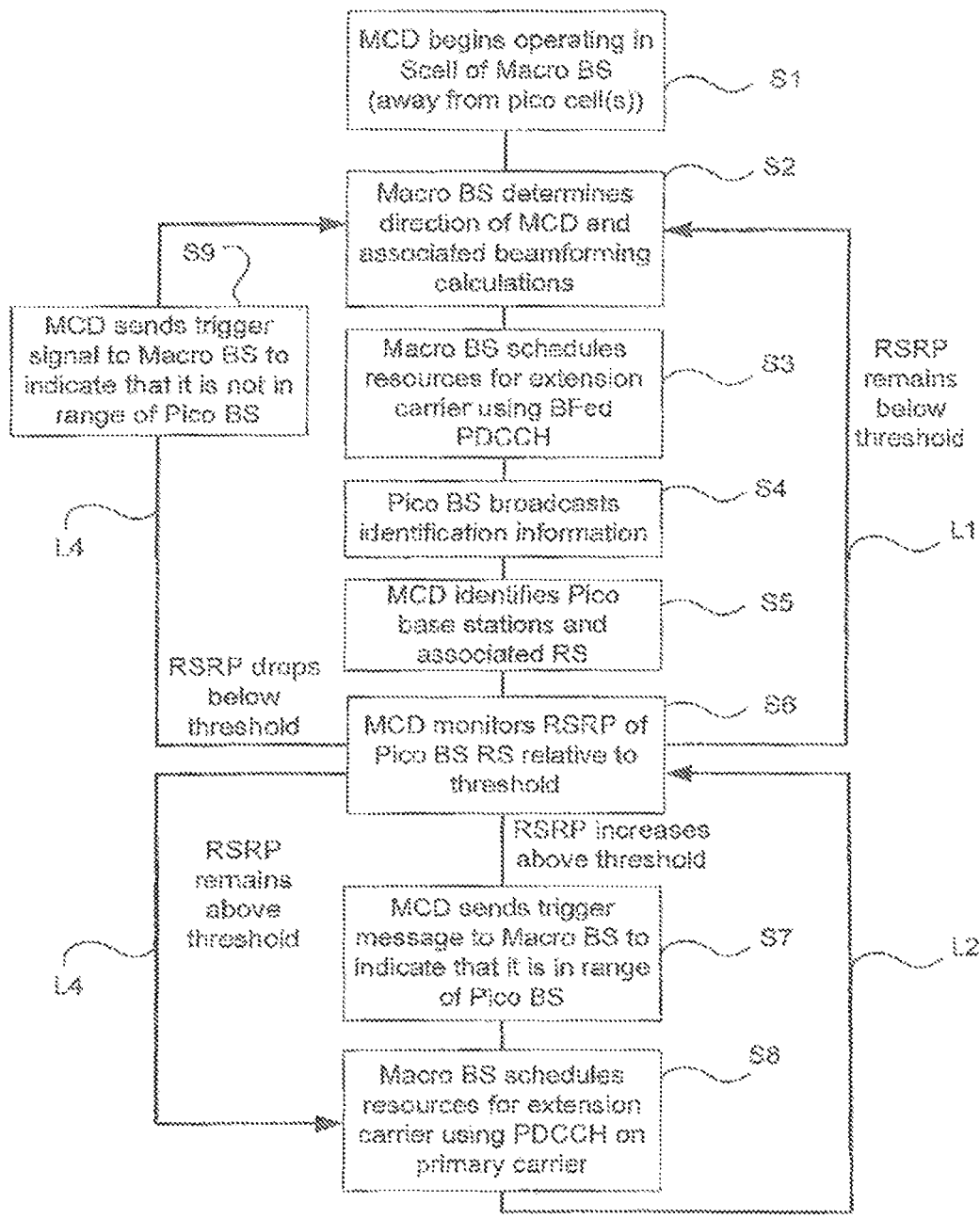
FIG. 7 shows a simplified flow chart illustrating operation of the telecommunication system of FIG. 1.

FIG. 7 is a flow chart illustrating typical operation of the communication system 1 to schedule resources for use by a mobile communication device (MCD) 3 during communications.

In FIG. 7, the exemplary operation scenario begins (at S1) when a mobile communication device 3 starts operating in the Scell 8 of the macro base station 5-1, in a geographical location that is sufficiently far from the pico Pcells 9 for there to be little risk of associated control channel to control channel interference. The base station 5-1 determines the direction of the mobile communication device 3 relative to the base station at S2 and identifies an appropriate precoding matrix (also referred to as a precoding vector) for use in beamforming the BFed PDCCH for that mobile communication device 3 in the determined direction. The macro base station 5-1 schedules the resources for the extension carrier C2 of the macro SCell 8 using within-carrier scheduling via the BFed PDCCH (at S3).

In this example, each pico base station broadcasts information for identifying itself to be a pico base station 5-2, 5-3 at S4 and the mobile communication device 3 determines, from this broadcast identity information, that the base station 5-2, 5-3 is a pico base station (at S5). The mobile communication device 3 identifies the reference signals that it receives from the pico base stations 5-2, 5-3 and then monitors the reference signal received power (RSRP) of these reference signals relative to the predetermined trigger threshold (at S6).

In this example, while the RSRP remains below the trigger threshold, the process in steps S2 to S6 is repeated via loop L1. When the RSRP increases above the trigger threshold it sends a 'trigger' message to the macro base station 5-1 to indicate that it is in sufficient range of a pico base station 5-2, 5-3, for control channel interference to be a significant risk at S7. On receipt of the trigger message, the macro base station 5-1 determines that it should no longer use a BFed PDCCH for that mobile communication device 3 and schedules the resources for the extension carrier C2 of the macro SCell 8 using cross-carrier scheduling via the PDCCH of the macro PCell's primary component carrier C1 at S8.

The mobile communication device 3 continues to monitor the reference signal received power (RSRP) of the reference signals from the pico base station 5-3, 5-3 relative to the predetermined trigger threshold at S6 (via loop L2). While the RSRP remains above the trigger threshold, the process in step S8 is repeated via loop L4. When the RSRP drops below the trigger threshold it sends another 'trigger' message to the macro base station 5-1 to indicate that it is no longer in sufficient range of a pico base station 5-2, 5-3 for control channel interference to be a significant risk (at S9 via loop IA). On receipt of the further trigger message, the macro base station 5-1 determines that it can start to use a BFed PDCCH for that mobile communication device 3 again and schedules the resources for the extension carrier C2 of the macro SCell 8 using within-carrier scheduling via the BFed PDCCH of the macro SCell's extension component carrier C2 (at S3) following appropriate direction finding and beamforming (at S2).

Figure 8:
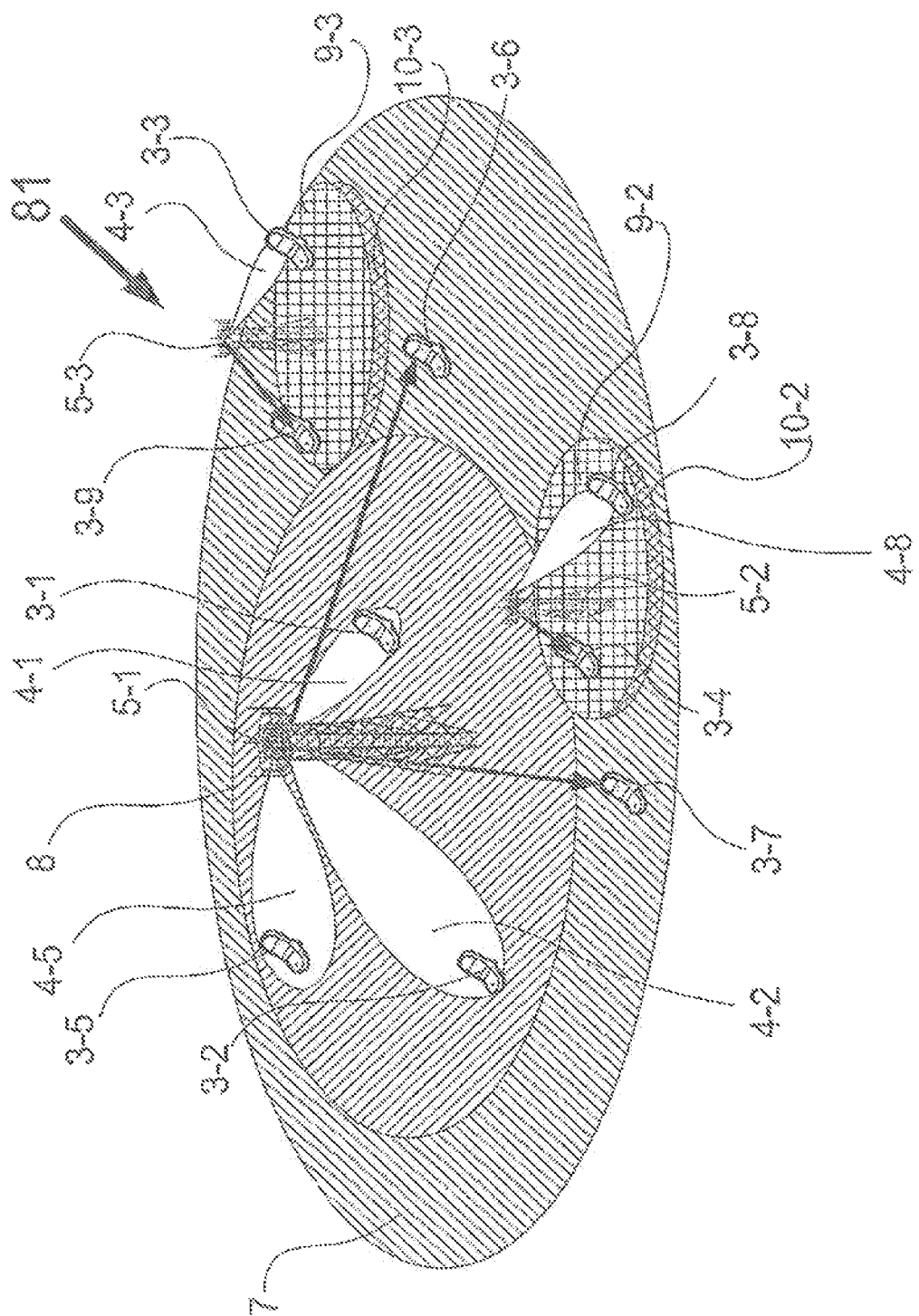
FIG. 8 schematically illustrates another telecommunication system.

Application in a Communication System in which Macro PCell and Pico PCell Use Same Carrier FIG. 8 schematically illustrates a further mobile (cellular) telecommunication system 81. The telecommunication system 81 is similar to that of FIG. 1 and corresponding parts are given the same reference numerals.

In the telecommunication system 81, a plurality of mobile communication devices 3-1 to 3-7 can communicate with other users via one or more of a plurality of base stations 5-1, 5-2 and 5-3. In the system illustrated in FIG. 1, each base station 5 shown is an Evolved Universal Terrestrial Radio Access Network (E-UTRAN) base station capable of operating in a multi-carrier environment.

In FIG. 8, the base station labelled 5-1 comprises a macro base station operating a plurality of relatively geographically large macro cells 7, 8 using respective component carriers (CCs) C1, C2, of a component carrier set. In this embodiment, the macro base station 5-1 operates component carrier C1 as a primary component carrier on which a primary cell (PCell) 7 is provided, and component carrier C2 as a secondary component carrier on which a secondary cell (SCell) 8 is provided. The PCell 7 has a larger geographical coverage than the SCell 8.

The other base stations 5-2, 5-3 shown in FIG. 8, each comprises a pico base station operating a plurality of 'pico' cells 9-2, 9-3, 10-2, 10-3, using a component carrier set having component carriers (CCs) C1, C2 corresponding in frequency to those used by the macro-base station 5-1. In this exemplary embodiment, unlike that shown in FIG. 1, each pico base station 5-2, 5-3 operates a respective pico primary cell (PCell) 9-2, 9-3 on component carrier C1 and a respective pico secondary cell (SCell) 10-2, 10-3 on component carrier C2.

Thus, unlike the system of FIG. 1, the pico Pcells 9 share substantially the same frequency band as the macro Pcell 7, and the pico Scells 10 share substantially the same frequency band as the macro Scell 8. The geographical coverage of each of the pico cells 9, 10 falls completely within the geographical coverage of the macro PCell 7. However, the overlap between the pico cells 9 and 10 and the macro SCell 8 is relatively small.

Figure 9:
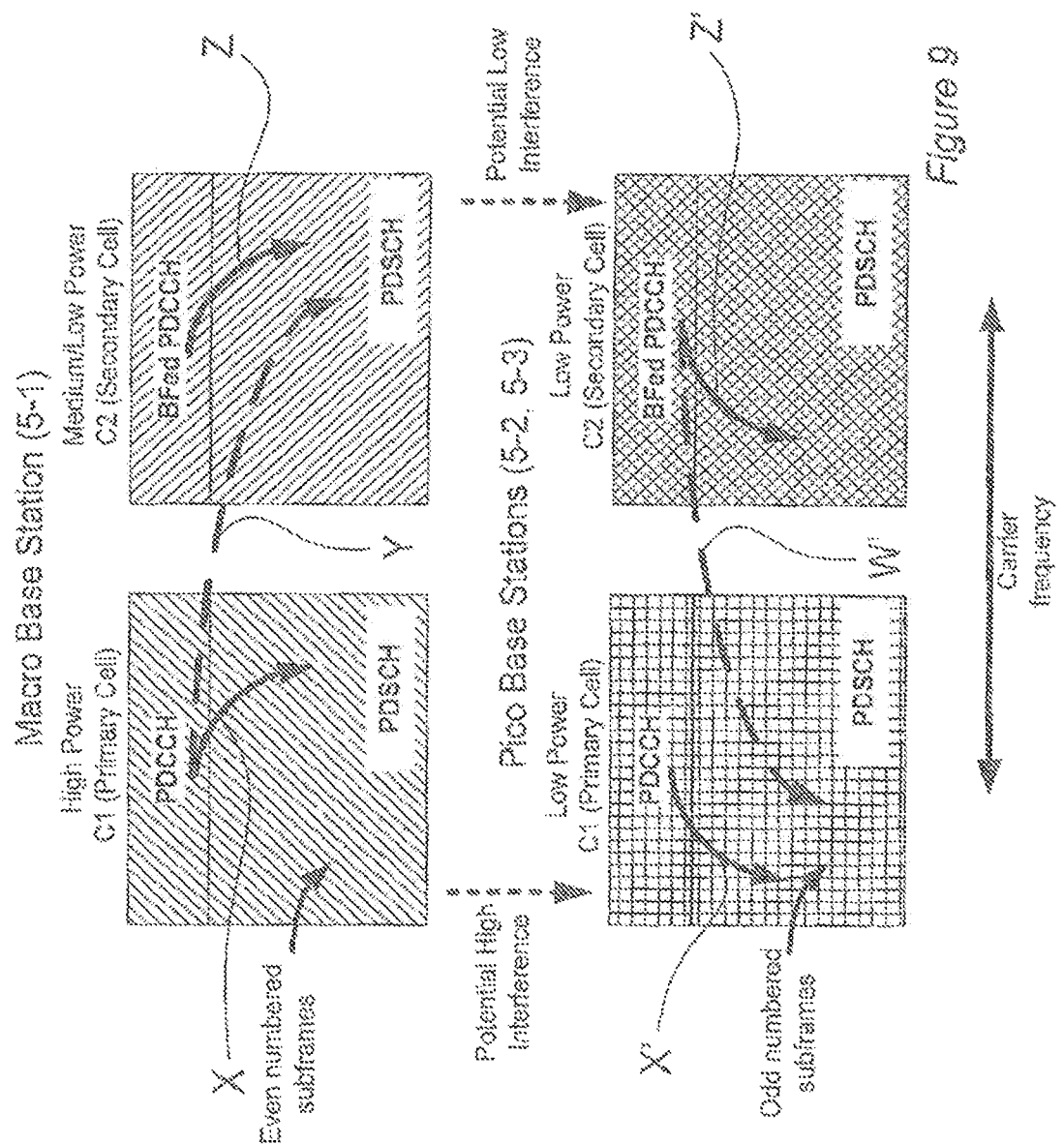
FIG. 9 illustrates a possible subframe configuration for component carriers for the telecommunication system of FIG. 8.

Referring to FIG. 9, in which the subframe configuration for the component carriers for each of the cells is illustrated, it will be apparent that there is a potential for relatively high communication interference between the PDCCH of the macro PCell 7 and the PDCCH of each of the pico PCells 9. In this exemplary embodiment, however, this interference is avoided by using a time domain solution in which the macro base station 5-1 transmits a PDCCH only in certain subframes and the pico base stations 5-2, 5-3 transmits a PDCCH in other subframes that do not overlap in time with the subframes used by the base station 5-1.

More specifically, the macro base station 5-1 uses a first predetermined set of subframes of a radio frame (in this example even numbered subframes) to transmit a PDCCH and each pico base station 5-2, 5-3 uses a second predetermined set of subframes of a radio frame (in this example odd numbered subframes) to transmit a respective PDCCH. Accordingly, because the PDCCH provided by the macro base station 5-1 and the pico base stations 5-2, 5-3, do not overlap the risk of control channel to control channel interference is avoided. The subframes in which a particular base station 5 does not transmit a PDCCH are also not used for data (e.g. PDCCH) transmission by that base station and, accordingly, are referred to as almost blank subframes (ABS). These ABS may, however, be used for transmission of common/cell-specific reference signals (CRS).

The Potential for any Interference Between the Macro SCell 8 and Each of the Pico SCells 10 is Relatively Small Each base station 5 operates carrier C1 for its PCell 7, 9 as a stand-alone carrier having a Physical Downlink Control Channel (PDCCH), which can be used to schedule the resources of its own component carrier C1 (as shown by arrows X and X'). The PDCCH of each component carrier C1 can also be used to schedule the resources of component carrier C2 ('cross carrier scheduling') to be used for communication purposes by a mobile communication device 3 when operating in the corresponding Scell 8, 10 (e.g. as shown by arrow Y).

The respective component carrier C2 used for each of the Scells 8, 10 is operated, by the associated base station 5, as an extension carrier (as described previously) on which a BFed PDCCH 4-1, 4-2, 4-3, 4-5, 4-8 can be provided. The BFed PDCCH 4-1, 4-2, 4-3, 4-5, 4-8 is directional and can be used selectively to schedule resources of the extension component carrier C2 for each SCell 8, 10 (e.g. as shown by arrows Z and Z') for specific mobile communication devices 3. The BFed PDCCH of each extension component carrier C2 can also be used to schedule the resources of the related primary component carrier C1 ('cross carrier scheduling') to be used for communication purposes by a mobile communication device 3 when operating in the corresponding Pcell 7, 9 (e.g. as shown by arrow W').

The BFed PDCCH 4-1, 4-2, 4-3, 4-5, 4-8 of the extension component carrier C2 for each SCell 8, 10 can be used selectively to schedule resources for a respective mobile communication device 3-1, 3-2, 3-3, 3-5, 3-8 operating within in the corresponding SCell 8, 10. Accordingly, the risk of interference in the region in which the macro SCell 8 and pico SCell 10 does overlap is significantly reduced because of the geographically localised nature of the BFed PDCCH. The DMRS pattern for the BFed PDCCH is different to that used for a legacy PDCCH.

Figure 10:
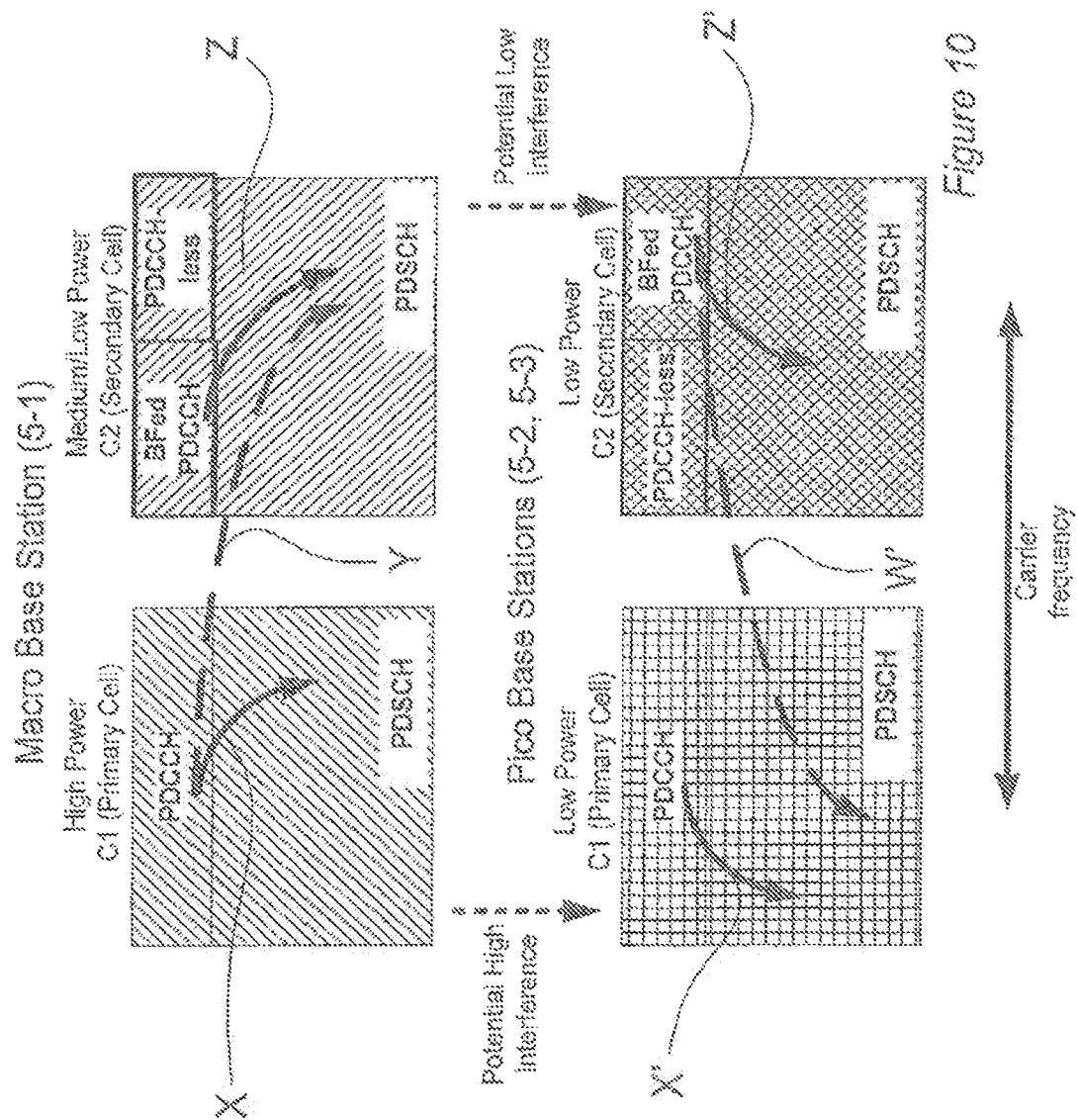
FIG. 10 illustrates another possible subframe configuration for component carriers for the telecommunication system of FIG. 8.

FIG. 10 shows another possible subframe configuration for the component carriers for the system of FIG. 8. In the configuration shown in FIG. 10, the control region of the subframes provided using component carrier C2 used for each SCell 8, 10 is partitioned into a BFed PDCCH region in which the BFed PDCCH is provided, and a PDCCH-less region in which no PDCCH or BFed PDCCH is provided. The regions are generally equal sized and are partitioned such that the BFed PDCCH region for the macro SCell 8 does not overlap with the BFed PDCCH region for the pico SCell 10, thereby reducing the small risk of control channel to control channel interference even further.

Figure 11:
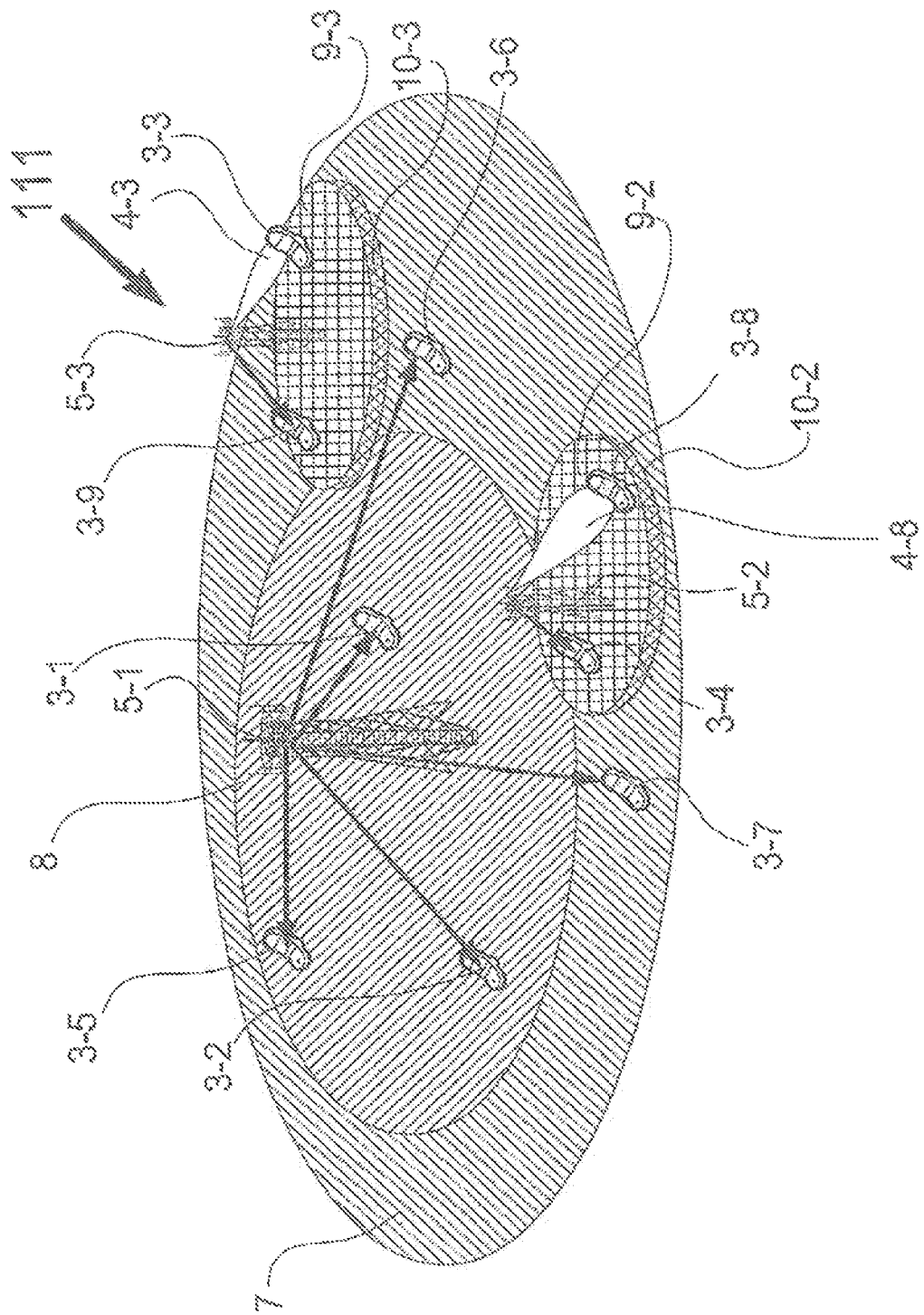
FIG. 11 schematically illustrates another telecommunication system.
Figure 12:
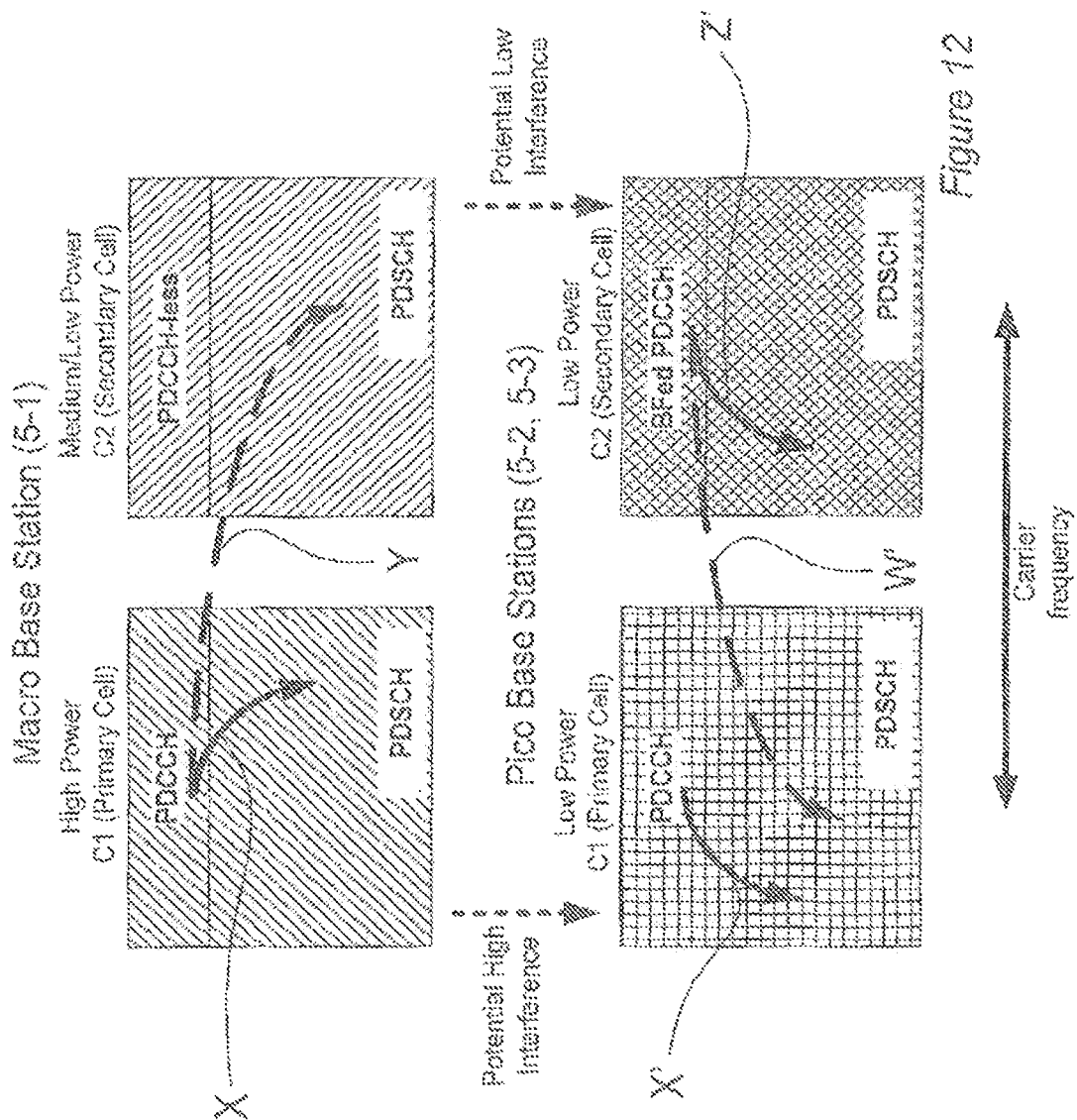
FIG. 12 illustrates a possible subframe configuration for component carriers for the telecommunication system of FIG. 10.

Application in a Communication System in which Only the Pico Base Stations Use a BFed PDCCH FIG. 11 schematically illustrates a further mobile (cellular) telecommunication system 111 and FIG. 12 shows a possible subframe configuration for the component carriers for the system of FIG. 11. The telecommunication system 111 is similar to that of FIG. 8 and corresponding parts are given the same reference numerals.

The communication system is, essentially, the same as that shown in FIG. 8 except that only the pico base stations 5-2, 5-3 provide a BFed PDCCH and, unlike the system of FIG. 8, the macro base station 5-1 provides all resource scheduling for the macro SCell 8 via a PDCCH provided in the primary component carrier C1 for the macro PCell 7 (e.g. as shown by arrow Y in FIG. 12).

More specifically, each base station 5 operates carrier C1 for its PCell 7, 9 as a stand-alone carrier having a PDCCH that can be used to schedule the resources of its own component carrier C1 (as shown by arrows X and X'). The PDCCH of each component carrier C1 can also be used to schedule the resources of component carrier C2 ('cross carrier scheduling') to be used for communication purposes by a mobile communication device 3 when operating in the corresponding Scell 8, 10 (e.g. as shown by arrow Y).

The respective component carrier C2 used for each of the Scells 8, 10 is operated, by the associated base station 5, as an extension carrier as described previously. However, the component carrier C2 used for the macro Scell 8 is not provided with a PDCCH or a BFed PDCCH and so can only be scheduled using the PDCCH provided on the primary component carrier C1. The component carrier C2 used for each pico Scell 10 operated by the associated pico base station 5-2, 5-3 can be provided with a BFed PDCCH 4-3, 4-8.

The BFed PDCCH 4-3, 4-8 is directional and can be used selectively to schedule resources of the extension component carrier C2 for each pico SCell 10 (e.g. as shown by arrow Z') for specific mobile communication devices 3. The BFed PDCCH of the extension component carrier C2 for each pico SCell 10 can also be used to schedule the resources of the related primary component carrier C1 ('cross carrier scheduling') to be used for communication purposes by a mobile communication device 3 (e.g. as shown by arrow W').

The BFed PDCCH 4-3, 4-8 of the extension component carrier C2 for each pico SCell 10 can thus be used selectively to schedule resources for a respective mobile communication device 3-3, 3-8 operating within the corresponding SCell 10. Accordingly, the risk of control channel to control channel interference in the region in which the macro SCell 8 and pico SCell 10 overlaps is significantly reduced.

Application in a Single Carrier Communication System

Figure 13:
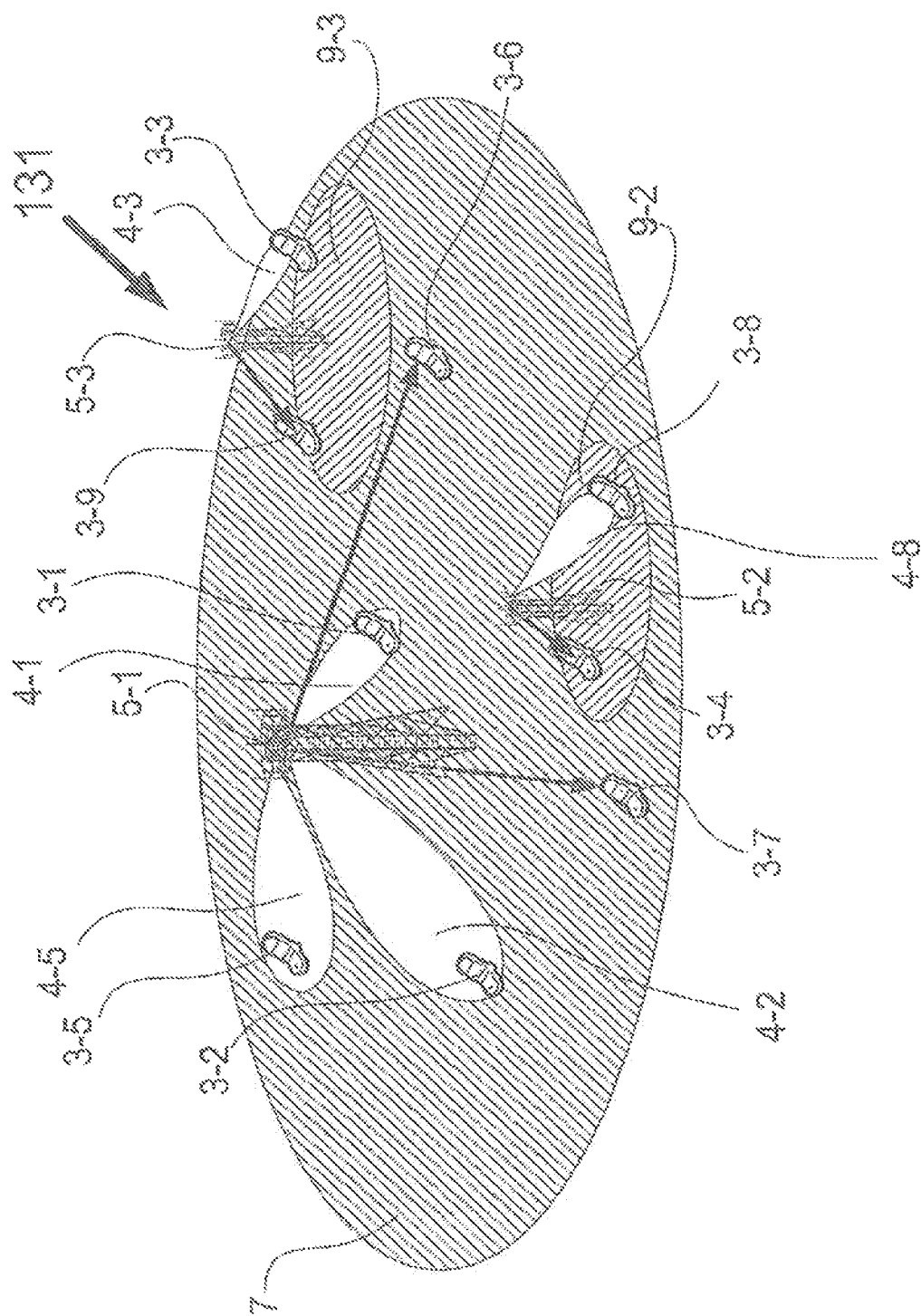
FIG. 13 schematically illustrates another telecommunication system.
Figure 14:
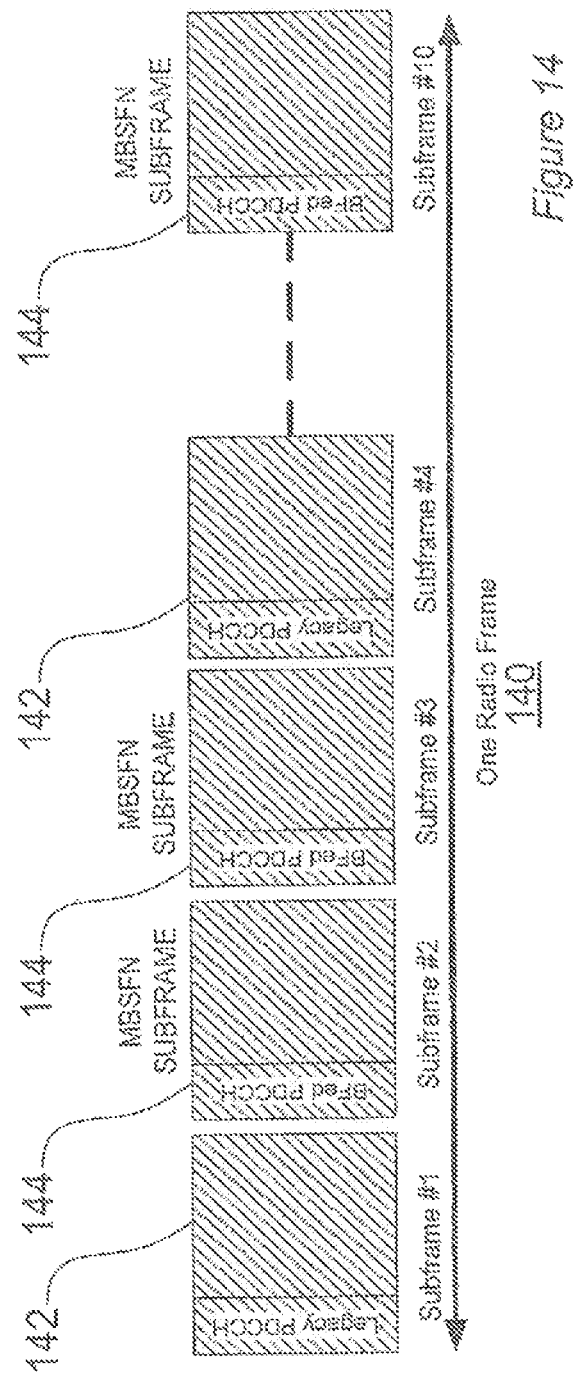
FIG. 14 illustrates a radio frame for the telecommunication system of FIG. 13.
Figure 15:
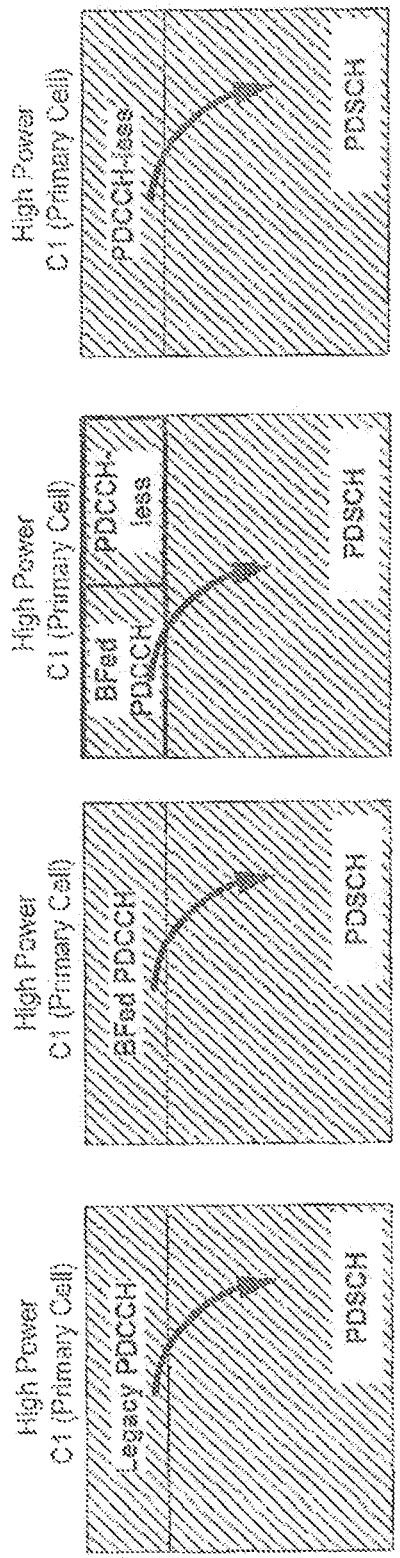
FIG. 15 illustrates a number of possible subframe configurations for component carriers for the telecommunication system of FIG. 13.
Figure 15:
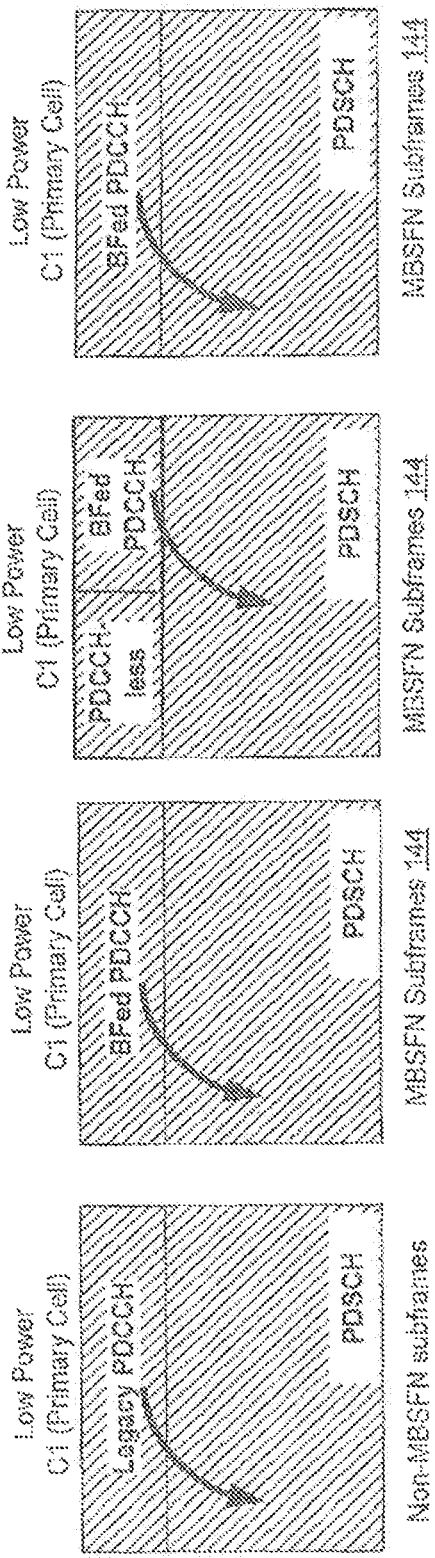

FIG. 13 schematically illustrates a further mobile (cellular) telecommunication system 131, FIG. 14 shows the configuration of a radio frame for the system 131 of FIG. 13, and FIG. 15 shows a number of possible subframe configurations for the system of FIG. 13. The telecommunication system 131 has similarities to those described earlier and corresponding parts are given the same reference numerals. In the system illustrated in FIG. 13, each base station 5 shown is an Evolved Universal Terrestrial Radio Access Network (E-UTRAN) base station capable of operating in a single-carrier environment.

A major difference between the system 131 shown in FIG. 13 and those described earlier is that the telecommunication system 131 is a single component carrier system which has been adapted in a manner that allows legacy mobile communication devices to use the system as normal (e.g. those defined by the 3$^{rd}$ Generation Partnership Project (3GPP) release 8, 9 and 10 standards) whilst more advanced mobile communication device can advantageously be scheduled using a BFed-PDCCH.

In FIG. 13, the base station labelled 5-1 comprises a macro base station operating a relatively geographically large macro cell 7 using a single component carrier C1 (e.g. a backwards compatible or 'legacy' component carrier). The other base stations 5-2, 5-3 shown in FIG. 13 each comprises a pico base station operating a pico cell 9-2, 9-3, using a component carrier C1 of the same frequency as the component carrier used by the macro base station 5-1.

The power used to provide pico cells 9 is low relative to the power used for the macro cell 7 and the pico cells 9 are therefore small relative to the macro cell 7. As shown in FIG. 13, in this example the geographical coverage of each of the pico cells 9 falls completely within the geographical coverage of the macro cell 7.

Referring to FIG. 14, the configuration of a radio frame 140 for the communication system 113 is shown. As seen in FIG. 14, and as those skilled in the art will readily understand, each radio frame comprises an E-UTRA radio frame comprising ten subframes 142, 144, a number of which are reserved for Multi-Media Broadcast over a Single Frequency Network (MBSFN). In FIG. 14, the subframes reserved for MBSFN are referred to as MBSFN subframes 144.

To allow legacy mobile communication devices to communicate successfully in the system 131, the non-MBSFN subframes 142 comprise legacy E-UTRA subframes having a legacy PDCCH (e.g. as defined in the relevant 3GPP release 8, 9 or 10 standards). Thus, older (e.g. release 8, 9 and 10) mobile communication devices are advantageously able to monitor the legacy PDDCH in the non-MBSFN subframes 142.

The MBSFN subframes 144 are configured with a BFed PDCCH with a corresponding new DMRS pattern, as described previously. Newer (e.g. release 11 and beyond) mobile communication devices 3, such as those shown in FIG. 13, are advantageously able to monitor both the legacy PDDCH in the non-MBSFN subframes 142 and the BFed PDCCH in the MBSFN subframes 144.

Referring to FIG. 15, there are a number of different options (labelled (a) to (c) in FIG. 15) for MBSFN subframe configuration for the system of FIG. 13. In the first option (a), the MBSFN subframes 144 of both the macro base station 5-1 and the pico base stations 5-2, 5-3 are provided with the BFed PDCCH. This option has the advantage of simplicity and the fact that beamformed control channels 4-1, 4-2, 4-3, 4-5, 4-8 can be used in both the pico and macro cells 7, 9.

In the second option (b), the MBSFN subframes 144 of both the macro base station 5-1 and the pico base stations 5-2, 5-3 are provided with a partitioned BFed PDCCH region and PDCCH-less region (similar to that described with reference to FIG. 10). The regions are generally equal sized and are partitioned such that the BFed PDCCH region for the macro cell 7 does not overlap with the BFed PDCCH region for the pico cell 8. This option reduces the risk of interference and allows beamformed control channels 4-1, 4-2, 4-3, 4-5, 4-8 to be used in both the pico and macro cells 7, 9.

In the third option (c), the MBSFN subframes 144 of the of the pico base stations 5-2, 5-3 are provided with a BFed PDCCH region, whilst the MBSFN subframes 144 of the macro base station 5-1 are not. This option reduces the risk of interference and allows beamformed control channels 4-3, 4-8 to be advantageously used in the pico cells 9 (for this option, the macro base station 5-1 does not use the beamformed control channels labelled 4-1, 4-2, 4-5 shown in FIG. 13).

Application in a Distributed Antenna System

Figure 16:
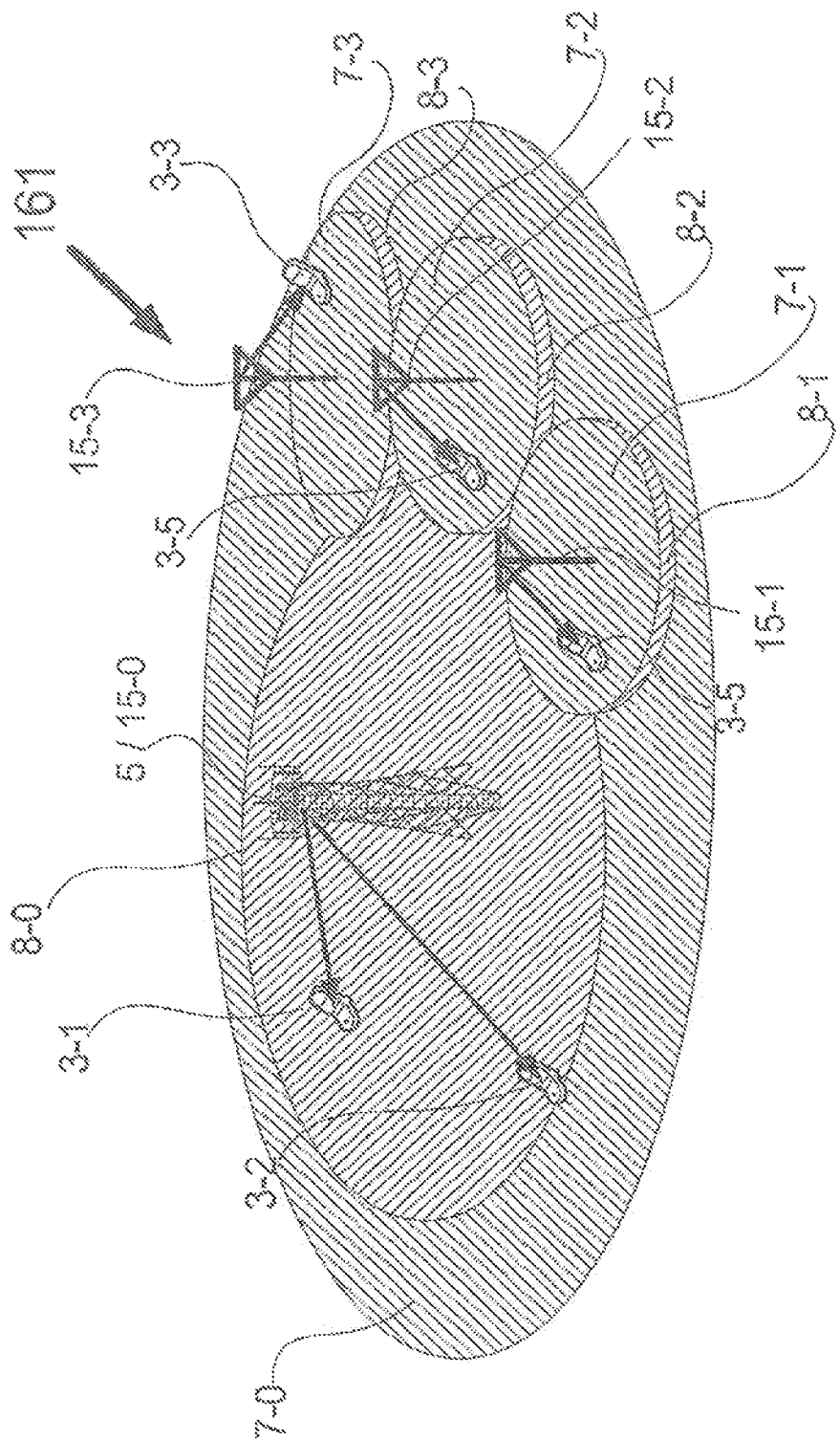
FIG. 16 schematically illustrates another telecommunication system.

FIG. 16 schematically illustrates a mobile (cellular) telecommunication system 161 in which a user of any of a plurality of mobile communication devices 3-1 to 3-7 can communicate with other users via a macro base station and a local antenna 15-0 at the base station and a plurality of geographically distributed antennas 15-1, 15-2 and 15-3. Each distributed antenna 15-1 to 15-3 is connected to the base station (for example by a fibre optic link) and the base station 5 controls reception and transmission via the antenna 15. The base station 5 uses a common cell identity for communications via each antenna 15 and hence a mobile communication device 3 being served by any one of the antenna 15 behaves as if it is operating in a single cell.

In FIG. 16, the base station effectively operates, on a first component carrier C1, a single 'common' primary cell (PCell) 7 that comprises a plurality of primary sub-cells 7-0 to 7-3 each provided using a different respective antenna 15-0 to 15-3. The base station operates, on a second component carrier C2, an effective secondary cell (SCell) 8 that comprises a plurality of secondary sub-cells 8-0 to 8-3 each provided using a different respective antenna 15-0 to 15-3.

In the example shown, the 'local' or 'master' primary sub-cell 7-0 operated via the local antenna 15-0 has a larger geographical coverage than the 'local' or 'master' secondary sub-cell 8-0 operated via the local antenna 15-0. The geographical coverage of each of the 'distributed' sub-cells 7-1 to 7-3 and 8-1 to 8-3 operated via the distributed antennas 15-1 to 15-3 falls completely within the geographical coverage of the local primary sub-cell 7-0 and overlaps partially with the geographical coverage of the local secondary sub-cell 8-0. The power of the carriers C1, C2 used to provide the distributed sub-cells 7-1 to 7-3 and 8-1 to 8-3 is set such that the geographical coverage of the distributed primary sub-cells 7-1 to 7-3 (of this example) are substantially co-incident with the geographical coverage of the distributed secondary sub-cells 8-1 to 8-3. In the example shown the distributed sub-cell 7-2, 8-2 provided using distributed antenna 15-2 partially overlaps with the distributed sub-cells 7-1, 7-3, 8-1, 8-3 respectively provided using the other distributed antennas 15-1, 15-3. It will be apparent, therefore, that there is a potential for relatively high control channel to control channel interference between the sub-cells 7, 8 where they overlap with one another.

In this exemplary embodiment, PDCCH to PDCCH interference on the primary component carrier C2 may be avoided by appropriate time domain separation of the subframes used to communicate the PDCCH (e.g. with ABS for the other sub-frames as described previously).

Figure 17:
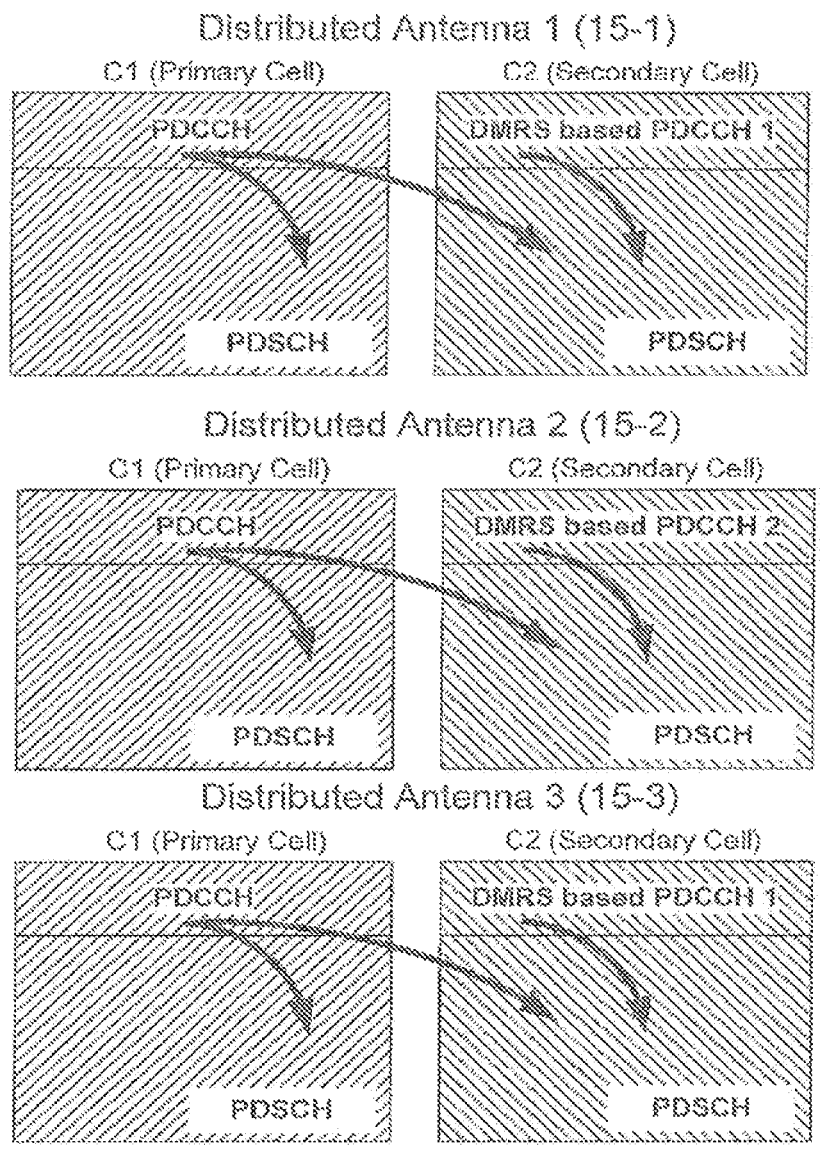
FIG. 17 illustrates a number of possible subframe configurations for component carriers for the telecommunication system of FIG. 16.

Referring to FIG. 17, in which the subframe configuration for the component carriers for the distributed cells is illustrated, control channel to control channel interference on the secondary carrier C2 is avoided by providing a different control channel (DMRS based PDCCH), each having a different respective DMRS sequence, in the control regions of respective subframes for overlapping distributed secondary subcells 8-1 to 8-3. The DMRS sequence selected for the different DMRS based PDCCHs is selected to be substantially orthogonal.

As shown in FIG. 17, a DMRS based PDCCH having a first DMRS sequence (DMRS based PDCCH 1) is provided in the control region of subframes communicated in the non-overlapping secondary subcells 8-1 and 8-3 provided via antennas 15-1 and 15-3. A DMRS based PDCCH having a second DMRS sequence (DMRS based PDCCH 2) is provided in the control region of subframes communicated in the secondary subcell 8-2, provided via antenna 15-2, that overlaps with the other secondary subcells 8-1 and 8-2, thereby helping to avoid control channel to control channel interference in the regions in which the secondary subcells 8 overlap.

The structure of each DMRS based PDCCH is, therefore, similar to that of the BFed PDCCH of earlier examples. However, in this embodiment, the new PDCCH is transmitted from a single antenna and is omnidirectional rather than beamformed. The structure of the DMRS based PDCCH is, therefore similar to the BFed PDCCH as transmitted from a single antenna port.

Other Modifications and Alternatives

Detailed embodiments have been described above. As those skilled in the art will appreciate, a number of modifications and alternatives can be made to the above embodiments and variations whilst still benefiting from the inventions embodied therein.

It will be appreciated that although the macro and the pico base stations 5 have each been described with particular reference to a different set of modules (as shown in FIGS. 4 and 5) to highlight the particularly relevant features of the different base stations 5, the macro and the pico base stations 5 are similar and may include any of the modules described for the other. For example, each pico base station 5-2, 5-3 may include a measurement management module 445, a direction determination module 447 and/or a beamforming module 449 as described with reference to FIG. 4. Similarly, the macro base station 5-1 may include a cell type identifier module 547 as described with reference to FIG. 5.

It will be appreciated that although the communication system 1 is described in terms of base stations 5 operating as macro or pico base stations, the same principles may be applied to base stations operating as femto base stations, relay nodes providing elements of base station functionality, home base stations (HeNB), or other such communication nodes.

In the above embodiments, the cell type identifier module has been described as providing information for identifying the cells controlled by the base station 5-2, 5-3 as pico cells 9, 10 and that this information is broadcast to mobile communication devices 3 that come within or close to the coverage area of the pico Pcell 9. It will be appreciated that the information for identifying the cells provided by the base station 5-2, 5-3 may comprise any suitable information such as a specific cell type identifier information element, or a cell identity (Cell ID) from which cell type can be derived. For example, if a HeNB, rather than a pico base station, operates the low power cells 9, 10, the cell type can be identified from comparing the cell identity provided by the HeNB to a range of Cell IDs known to be allocated to HeNBs.

Further, whilst in the above description it is the mobile communication device that determines whether a particular cell is a pico cell for which control channel interference is a risk, the macro base station could also do this. For example, the macro base station may mandate any mobile communication device configured with a BFed PDCCH, to carry out RSRP measurements and to compare the results with predefined threshold value (e.g. similar to the 'trigger' threshold as described). If the results are found to be above that threshold value, the mobile communication device simply reports the measurement to the base station with cell identity information (e.g. the Cell ID) for the cell to which the measurements relate. On receipt of the report, the macro base station (which has access to information identifying the cell IDs for the pico cells in its coverage area) can avoid using a BFed PDCCH for a mobile communication device that is close to a pico cell within its coverage area. In the case of HeNBs, the macro base station is able to identify them, based on their cell IDs, so that the macro base station can avoid using the BFed PDCCH for a mobile communication device that is close to an identified HeNB cell.

Referring to the embodiment described with reference to FIG. 1, whilst a BFed PDCCH is not provided for the extension component carrier C1 of the pico SCells 10-2, 10-3, it will be appreciated that such a BFed PDCCH could potentially be provided, albeit at the possible expense of interference between the PDCCH of the macro PCell 7 and the BFed PDCCH of the pico SCell 9. It will also be appreciated that whilst it has not been described in significant detail above, a BFed PDCCH of any of the communication systems could potentially be used for cross carrier scheduling for any component carrier of that system regardless of whether or not a control channel is provided for that component carrier.

Whilst a particular DMRS pattern has been described for the BFed PDCCH any suitable DMRS pattern may be used that is different to that used for a legacy PDCCH.

It will be appreciated that the predetermined trigger threshold may be reconfigurable. Further, the trigger threshold may be adaptive, for example to allow it to change automatically, or semi-automatically, based on prevailing radio conditions. The threshold value, and timing of the trigger message, may vary in dependence on the implementation. The optimum threshold value for different situations may be arrived at based on simulation.

Where a flow chart shows discrete sequential blocks, this is for the purposes of clarity only and, it will be appreciated that many of the steps may occur in any logical order, may be repeated, omitted, and/or may occur in parallel with other steps. For example, referring to step S4 of the flow chart of FIG. 7, the pico base stations may broadcast identification periodically, in parallel with the other of the steps shown. Similarly, steps S4 and S5 need not be repeated every iteration of loops L1 and L4. Further, the mobile communication device 3 may monitor the RSRP of received reference signals continuously in parallel with the other steps.

Although the provision a beamformed PDCCH has been described in detail it will be appreciated that other information, deliberately omitted from transmission on an extension carrier, may also be provided in a beamformed manner on extension carriers. For example a new beamformed Physical Hybrid ARQ Indicator Channel (BFed PHICH) may also be provided on the extension carrier.

Although the terminology used refers to a beamformed PDCCH (BFed PDCCH), any similar terminology may be used appropriately to refer to a new beamformed PDCCH and/or a PDCCH having a modified DMRS (for example 'Precoded PDCCH', 'DMRS-based PDCCH', 'Codebook based beamforming PDCCH').

The beamforming may be codebook based in which a 'precoding' vector (for weighting the transmissions from respective antennas) is selected from a set of predefined precoding vectors (the 'codebook'). In this case the mobile communication device either knows, or is informed of, the precoding vector used. The beamforming may be non-codebook based in which the network applies arbitrary beamforming at the transmitter and the mobile communication device has no immediate means for determining the nature of the beamforming that has been applied. In this case a mobile communication device specific reference signal to which the same beamforming has been applied is transmitted to allow estimation of the channel experienced by the beamformed transmission. The pico and macro base stations may respectively use different beamforming techniques (e.g. the pico base station may use codebook based beamforming or and the macro base station may use non-codebook based beamforming or vice versa).

In the example described with reference to FIG. 13, the BFed PDCCH was described as being provided in the MBSFN subframes of a radio frame whilst the legacy PDCCH was placed in other subframes. It will be appreciated that whilst using the MBSFN subframes is advantageous in terms of simplicity of implementation, any appropriate predetermined subframes may be used (for example ABS subframes). In a particularly advantageous scenario for example, the subframes used for BFed PDCCH transmission use MBSFN subframes that are also configured to be ABS subframes. The benefits of this arise because MBSFN subframes are standardised for 3GPP, Release 8 mobile communication devices, and ABS subframes are standardised for 3GPP Release 10 mobile communication devices. Thus, for backward compatibility, Release 8 mobile communication devices are able to interpret MBSFN subframes, and Release 10 mobile communication devices are able to interpret both MBSFN and ABS subframes. Accordingly, having MBSFN subframes carrying the new BFed control channel as a subset of subframes configured for Almost Blank Subframes (ABS) means that the legacy Release 10 mobile communication devices will be able to effectively ignore them as ABS subframes carrying no data, Release 8 mobile communication devices will be able to treat them as MBSFN subframes and newer mobile communication devices, as described for the above embodiments, will be able to treat them as BFed PDCCH carrying sub-frames.

Furthermore, in the example described with reference to FIG. 13, by using co-ordinated scheduling in which the macro base station 5-1 and pico base station 5-2, 5-3 exchange information on when the BFed PDCCH is to be scheduled, collision between the BFed PDCCHs transmitted by those base stations 5 can be avoided.

In yet another advanced variation of the example described with reference to FIG. 13, the macro base station 5-1 and pico base station 5-2, 5-3 can use the same resource for BFed PDCCHs where orthogonal communication streams are applied based on CSI information exchanged between the macro base station 5-1 and pico base station 5-2, 5-3.

In the exemplary embodiments described above, each new control channel having a new DMRS pattern has been described as being provided in a control region of a subframe. It will be appreciated that whilst this is particularly beneficial, the control channel could be provided in a data region of a subframe or partially in a control region and partially in a data region whilst still benefiting from many of the advantages provided by the invention. Nevertheless, despite the fact that there may be a reluctance to reuse a region normally reserved for the existing PDCCH because of the perceived technical difficulties in doing so, providing the new control channel(s) having the new DMRS in the control region, as opposed to the data region does provide some notable advantages. Firstly, for example, decoding a control channel in the region of a subframe reserved as a control region is significantly quicker than decoding a control channel in the region of a subframe reserved as a data region because mobile communication devices look at the control region before the data region. Secondly, for similar reasons, decoding a control channel in the region of a subframe reserved as a control region uses less battery power than decoding a control channel in the region of a subframe reserved as a data region. Further, when no data resources are allocated by the control channel, having the control channel in the control region allows the mobile communication device to ignore the data region completely, with the power and speed advantages that follow from such an arrangement.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the exemplary embodiments described above, the base stations 5 and mobile communication devices 3 each include transceiver circuitry. Typically, this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

The invention claimed is:

1. A mobile communication device configured to communicate with a communication apparatus, the mobile communication device comprising:
   at least one memory storing instructions; and
   at least one processor configured to process the instructions to:
   receive a first demodulation reference signal (DMRS) transmitted from the communication apparatus using at least one resource element on at least one of first two antenna ports of a plurality of antenna ports, wherein the first DMRS is associated with transmission of a first physical downlink control channel (PDCCH) transmitted using the at least one of the first two antenna ports of the plurality of antenna ports;
   receive a second DMRS transmitted from the communication apparatus using at least one resource element on at least one of second two antenna ports of the plurality of antenna ports, wherein the second DMRS is associated with transmission of a second PDCCH transmitted using the at least one of the second two antenna ports of the plurality of antenna ports;
   in a case where the first PDCCH is transmitted using the at least one of the first two antenna ports, demodulate the first PDCCH based on the first DMRS; and
   in a case where the second PDCCH is transmitted using the at least one of the second two antenna ports, demodulate the second PDCCH based on the second DMRS.

2. A communication apparatus configured to communicate with a mobile communication device, the communication apparatus comprising:
   at least one memory storing instructions; and
   at least one processor configured to process the instructions to:
   transmit, to the mobile communication device, a first demodulation reference signal (DMRS) using at least one resource element on at least one of first two antenna ports of a plurality of antenna ports, wherein the first DMRS is associated with transmission of a first physical downlink control channel (PDCCH) transmitted using the at least one of the first two antenna ports of the plurality of antenna ports,
   transmit, to the mobile communication device, a second DMRS using at least one resource element on at least one of second two antenna ports of the plurality of antenna ports, wherein the second DMRS is associated with transmission of a second PDCCH transmitted using the at least one of the second two antenna ports of the plurality of antenna ports;
   in a case where the first PDCCH is transmitted using the at least one of the first two antenna ports, modulate the first PDCCH based on the first DMRS; and
   in a case where the second PDCCH is transmitted using the at least one of the second two antenna ports, modulate the second PDCCH based on the second DMRS.

3. A communication control method in a mobile communication device which configured to communicate with a communication apparatus, the communication control method comprising:
   receiving a first demodulation reference signal (DMRS) transmitted from the communication apparatus using at least one resource element on at least one of first two antenna ports of a plurality of antenna ports, wherein the first DMRS is associated with transmission of a first physical downlink control channel (PDCCH) transmitted using the at least one of the first two antenna ports of the plurality of antenna ports;
   receiving a second DMRS transmitted from the communication apparatus using at least one resource element on at least one of second two antenna ports of the plurality of antenna ports, wherein the second DMRS is associated with transmission of a second PDCCH transmitted using the at least one of the second two antenna ports of the plurality of antenna ports;
   in a case where the first PDCCH is transmitted using the at least one of the first two antenna ports, demodulating the first PDCCH based on the first DMRS; and
   in a case where the second PDCCH is transmitted using the at least one of the second two antenna ports, demodulating the second PDCCH based on the second DMRS.

4. A communication control method in a communication apparatus configured to communicate with a mobile communication device, the communication control method comprising:
   transmitting, to the mobile communication device, a first demodulation reference signal (DMRS) using at least one resource element on at least one of first two antenna ports of a plurality of antenna ports, wherein the first DMRS is associated with transmission of a first physical downlink control channel (PDCCH) transmitted using the at least one of the first two antenna ports of the plurality of antenna ports,
   transmitting, to the mobile communication device, a second DMRS using at least one resource element on at least one of second two antenna ports of the plurality of antenna ports, wherein the second DMRS is associated with transmission of a second PDCCH transmitted using the at least one of the second two antenna ports of the plurality of antenna ports;
   in a case where the first PDCCH is transmitted using the at least one of the first two antenna ports, modulating the first PDCCH based on the first DMRS; and in a case where the second PDCCH is transmitted using the at least one of the second two antenna ports, modulating the second PDCCH based on the second DMRS.

\* \* \* \* \*